United States Patent
Cesario et al.

(10) Patent No.: US 7,962,272 B2
(45) Date of Patent: *Jun. 14, 2011

(54) METHOD AND ASSOCIATED DEVICE FOR SENSING THE AIR/FUEL RATIO OF AN INTERNAL COMBUSTION ENGINE

(75) Inventors: Nicola Cesario, Casalnuovo di Napoli (IT); Paolo Amato, Limbiate (IT); Maurizio Di Meglio, Casoria (IT); Francesco Pirozzi, Naples (IT); Giovanni Moselli, Grumo Nevano (IT); Ferdinando Taglialatela-Scafati, Giugliano (IT); Francesco Carpentieri, San Giorgio del Sannio (IT)

(73) Assignee: STMicroelectronics S.R.L., Agrate Brianza (MI) (IT)

( * ) Notice: Subject to any disclaimer, the term of this patent is extended or adjusted under 35 U.S.C. 154(b) by 13 days.

This patent is subject to a terminal disclaimer.

(21) Appl. No.: 12/202,646

(22) Filed: Sep. 2, 2008

(65) Prior Publication Data

US 2009/0005953 A1 Jan. 1, 2009

Related U.S. Application Data

(62) Division of application No. 11/368,169, filed on Mar. 3, 2006, now Pat. No. 7,440,839.

(30) Foreign Application Priority Data

Mar. 4, 2005 (EP) .................................... 05425121

(51) Int. Cl.
*F02D 45/00* (2006.01)
(52) U.S. Cl. ...................................... 701/102; 123/435
(58) Field of Classification Search .......... 701/101–106, 701/109, 41, 138, 189, 190, 194, 196, 199; 123/434–436, 480, 486, 494; 73/35.03, 35.04, 73/35.12, 114.16, 114.17, 114.22
See application file for complete search history.

(56) References Cited

U.S. PATENT DOCUMENTS 4,736,724 A * 4/1988 Hamburg et al. ............. 123/435
4,896,642 A * 1/1990 Washino et al. ......... 123/406.42
(Continued)

FOREIGN PATENT DOCUMENTS

JP 59221433 12/1984
(Continued)

OTHER PUBLICATIONS

"Fuzzy logig Vs Machine Learning: An Investigation Project Summary" http://www.kev.pulo.com.au/ai/fuzzyml-summary.html.*

(Continued)

*Primary Examiner* — Stephen K Cronin
*Assistant Examiner* — Johnny H Hoang
(74) *Attorney, Agent, or Firm* — Lisa K. Jorgenson; Allen, Dyer, Doppelt, Milbrath & Gilchrist, P.A.

(57) ABSTRACT

A method of sensing the air/fuel ratio in a combustion chamber of an internal combustion engine that may be easily implemented by a respective low-cost device includes a pressure sensor and a learning machine that generates a sensing signal representing the air/fuel ratio by processing the waveform of the pressure in at least one cylinder of the engine. In practice, the learning machine extracts characteristic parameters of the waveform of the pressure and as a function of a certain number of them generates the sensing signal.

11 Claims, 24 Drawing Sheets

U.S. PATENT DOCUMENTS

| | | | | |
|---|---|---|---|---|
| 4,928,655 | A | 5/1990 | Kako | 123/488 |
| 5,765,532 | A * | 6/1998 | Loye | 123/435 |
| 5,878,717 | A * | 3/1999 | Zur Loye | 123/435 |
| 5,935,189 | A | 8/1999 | Park | 701/111 |
| 6,467,472 | B1 * | 10/2002 | Strauss | 123/676 |
| 6,560,526 | B1 * | 5/2003 | Matekunas et al. | 701/104 |
| 6,671,613 | B2 * | 12/2003 | Stotsky et al. | 701/113 |
| 6,938,598 | B1 * | 9/2005 | Lewis et al. | 123/179.1 |
| 7,021,287 | B2 * | 4/2006 | Zhu et al. | 123/435 |
| 7,073,485 | B2 * | 7/2006 | Truscott et al. | 123/406.22 |
| 7,079,936 | B2 | 7/2006 | Honda | 701/102 |
| 7,207,316 | B2 * | 4/2007 | Moriya et al. | 123/435 |
| 7,401,606 | B2 * | 7/2008 | Lewis et al. | 123/685 |
| 2004/0139949 | A1 * | 7/2004 | Koseki et al. | 123/568.14 |
| 2004/0149255 | A1 * | 8/2004 | zur Loye et al. | 123/295 |
| 2005/0166665 | A1 * | 8/2005 | Honda | 73/35.12 |
| 2005/0251322 | A1 * | 11/2005 | Wang et al. | 701/114 |

FOREIGN PATENT DOCUMENTS

WO    WO2004048761    6/2004

OTHER PUBLICATIONS

Journal of Machine Learning Research 7 (2006), Published Jul. 2006.*

"Neural Networks and Machine Learning" http://cs.byu.edu/neural_networks_and_machine_learning.*

"Cylinder Air/Fuel Ratio Estimation Using Net Heat Release Data", Tunestal et al; IFAC Workshop on Advances in Automotive Control, Mar. 28, 2001, pp. 239-247, XP001032740.

"Cylinder Air/Fuel Ratio Estimation Using Net Heat Release Data", Tunestal et al; Control Engineering Practice, Pergamon Press, Oxford, GB, vol. 11, No. 3, 2003, pp. 311-318, XP001157572, ISSN: 0967-0661.

* cited by examiner

○ TRAINING DATA- NEURAL NETWORK NEURONS
● TESTING DATA

MULTISPREAD PNN NEURONS SPREAD SET-UP
HAS BEEN OPTIMIZED BY EVOLUTIONARY ALGORITHMS

⊙ ○ ⊚ NEURAL NETWORK NEURONS SPREADS- NEURONS SENSIBILITY

METHOD AND ASSOCIATED DEVICE FOR SENSING THE AIR/FUEL RATIO OF AN INTERNAL COMBUSTION ENGINE

RELATED APPLICATION

This application is a divisional of U.S. patent application Ser. No. 11/368,169 filed Mar. 3, 2006, now U.S. Pat. No. 7,440,839 the entire disclosure of which is hereby incorporated herein by reference.

FIELD OF THE INVENTION

This invention relates to control systems for the operating parameters of internal combustion engines, and, more particularly, to a method and associated device for sensing the air/fuel ratio (briefly AFR) of an internal combustion engine, and an associated control system that uses this sensing device.

BACKGROUND OF THE INVENTION

In the last twenty years, fundamental goals of engine manufacturers are to achieve significant reductions of the amounts of pollutants emitted at the engine exhaust, and lower fuel consumption without compromising speed and torque performances. For these reasons, an efficient engine control based on a comprehensive monitoring of the many engine working parameters is desired.

To maintain a strict control of the engine working parameters, Engine Management Systems (EMS) or Engine Control Units (ECU) are used. The EMS implements control strategies which achieve the optimum trade-off between several contradictory objectives: high output power when required by the driver, low emission levels and low fuel consumption. At the same time, in a spark-ignition engine, the EMS brings and maintains the engine in a specified operating range such that the three-way catalytic converter can further reduce the undesired content of the exhaust gases. The EMS controls the amount of fuel injected in the engine combustion chamber (fuel pulse width), the point in the engine cycle at which the mixture air fuel is ignited (ignition timing) and in advanced engine designs, other parameters, such as the valve timing. The EMS determines values for these parameters from measured quantities such as speed, torque, air mass flow rate, inlet-manifold pressure, temperatures at several critical points and throttle angle.

FIG. 1 illustrates the EMS function. The EMS determines values for Controlled Variables from knowledge of the Measured Variables to achieve the System Aims. EMS essentially includes three components: engine maps (look-up tables stored in a ROM), a controller and sensors, as schematically depicted in FIG. 2.

In addition to sensors for measuring quantities of interest, such as speed, manifold pressure, air mass flow rate, temperature (that is, the Measured Variables appearing in both FIGS. 1 and 2), in FIG. 2 appear other sensors too. These additional devices monitor whether the engine is working according to the System Aims, or not. Therefore, they have an active part in the real time updating process of controlled variables and, eventually of the engine maps. For example, in a spark-ignition engine a sensor of this type is the so-called lambda sensor. The lambda sensor, mounted in the exhaust stream as schematically shown in the block diagram of FIG. 3, determines whether the lambda ratio (that is AFR/$AFR_{stoichiometric}$) is above or below unity from the amount of oxygen detected in the exhaust gas mixture. The EMS uses this information to adjust the fuel pulse width and/or the ignition timing to keep the lambda ratio as close as possible to unity.

To keep the air/fuel ratio (AFR) within such a narrow range, a lambda sensor is inserted in the outlet of exhaust gases for monitoring the amount of oxygen in the exhaust gases. The lambda sensor provides a signal representative of the value of the ratio $$\lambda = \frac{\text{Air}/\text{Fuel}}{\text{Air}/\text{Fuel}_{stoichiometric}}$$

If $\lambda<1$ the mixture is rich of fuel, while if $\lambda>1$ the mixture is lean of fuel, as schematically shown in FIG. 4.

The signal generated by the lambda sensor is input to the controller of the engine that adjusts the injection times and thus the fuel injected during each cycle for reaching the condition $\lambda=1$.

Many lambda sensors actually available, the so-called on/off lambda sensors, do not evaluate the ratio of the mixture and thus the exact value of $\lambda$, but signal whether the mixture is reach or lean. Considering that the injection time should ideally be proportional to the air/fuel ratio, these on/off lambda sensors do not allow a precise regulation.

There are lambda sensors that generate a signal representative of the effective value of the air/fuel ratio, but these lambda sensors (the so-called "wide-band lambda sensors") are either very expensive or not very accurate. The following table compares costs and accuracies of commercially available "wide-band lambda sensors":

|  | accuracy for lean mixtures | accuracy for stoichiometric mixtures | accuracy for rich mixtures | cost (USD) |
| --- | --- | --- | --- | --- |
| McLaren electronic systems | 1.7% | 0.1% | 1.7% | 1500-1800 |
| MoTeC | 2.5% | 1.75% | 1.75% | 800-900 |
| Bosch LSM 11 | 1.5% | unknown | unknown | 300-400 |
| Horiba LD-700 | 8.0% | 4.0% | 8.0% | 60-80 |

Engines manufacturers are generally reluctant to a proliferation of sensors unless they produce valuable improvements that could not otherwise be attained. Virtual-sensors techniques are generally welcome because of their comparably lower cost, reliability and sturdiness. Virtual-sensors allow estimates of quantities of interest without the necessity for sensors dedicated to the measurements. In this field, intelligent systems models, such as neural networks, are attractive because of their capabilities in pattern recognition and signal analysis problems [1].

An approach to realize a virtual lambda sensor uses neural networks to correlate certain features of spark plug voltage waveforms with specific values of air fuel ratio [2], [3]. The spark plug is in direct contact with the combustion processes which are occurring in the engine cylinder, hence analysis of the spark plug voltage waveforms seems to be potentially a suitable method of monitoring combustion in spark ignition engines.

There are essentially two methods of using a spark plug as a combustion sensor, namely: the Ionic-Current and Spark Voltage Characterization (SVC) methods. In the ionic-current system, the spark plug is used as a sensor during the "non-firing" phase of the pressure cycle, which is the part of the pressure cycle after the spark advance, that is, after the spark ignition. This is done by applying a small voltage of about 100 Volts to the spark plug and measuring the current. The current is supported by reactive ions in the flame that carry on ionic current across the spark plug gap. The type and the number of ions, formed during and after the combustion, depends on the combustion conditions. The Ionic-Current depends also on other parameters such as temperature, pressure and other. Recently, much work has been done on the use of Ionic-Current for monitoring combustion [4], [5], [6][7].

The SVC method rests on the analysis of the time-varying voltage detected across the gap of the spark plug. Since the SVC method involves the analysis of the ignition voltage waveform itself, it does not require additional biasing means and associated high voltage switching circuitry.

FIG. 5 illustrates a typical spark voltage waveform. The shape of spark voltage waveform has several predictable phases. When the EHT (Extra High Tension) pulse is generated, the potential difference across the gap rises up to 12 kV and breakdown occurs. Breakdown is a fall in voltage that produces a characteristic voltage spike of about 10 µs in duration. Thereafter, a glow-discharge tail region of the waveform of a few milliseconds duration appears. Tests have demonstrated that changes of engine working parameters lead to changes of the shape of certain features of the waveform. However, it is far from being easy to predict these variations as the engine parameters are varied. In fact, random variations occur between successive sparks even when engine working parameters are kept constant.

Interactions of parameters, such as combustion temperatures, compression, composition of the air-fuel gas mixture, affect the shape of the breakdown voltage spike in the spark voltage waveform. Changes of the lambda ratio lead to breakdown voltage changes and to subtle changes in the overall shape of the ignition spark waveform. Lambda ratio changes appear to affect both the shapes of the breakdown voltage spike and of the flow-discharge tail portion of the waveform. An analytic relationship between lambda values and instantaneous voltage values of the spark voltage waveforms has not been found yet. However, several articles ([8] and [9]) sustain a correlation between the vector formed through a periodic sampling of the spark plug voltage (spark-voltage vector) and lambda values.

The Spark Voltage Characterization (SVC) technique is based on setting up an effective neural network for associating the spark-voltage vector and lambda ratio.

AFR Estimation Using Spark Voltage Characterization by Neural Network

According to R. J. Howlett et al. in [8], [9], and [10] it is possible to design a Virtual Lambda Sensor, that is a device for sensing the air/fuel without analyzing the exhaust gases of the engine.

Such a virtual sensor is based on a neural network trained to find the best correlation between characteristic aspects of the spark voltage waveform and lambda values. The trained neural network determines, for a current vector of characteristic values of the spark voltage, whether the air/fuel ratio (lambda value) is in the stoichiometric mixture range or in lean or rich mixture ranges.

FIG. 6 shows a typical experimental arrangement to acquire data for training of virtual lambda sensor models. The dynamometer, by which an engine "dummy" load may be varied as desired, is used to measure load-torque and to calculate the output power. Setting of throttle position and fuel pulse width allows changing the air-fuel ratio. In this way, a data set related to the whole range of lambda values may be established.

The blocks EMU, A-D converter and DSP are an Engine Management Unit, Analog-to-Digital converter and Digital Signal Processor, respectively.

Air-fuel ratio values are measured by an exhaust gas analyzer. To measure spark plug voltage the ignition system is modified by the addition of a high-voltage test-probe at the spark plug.

In these approaches, a MLP (Multiple Layer Perceptron) neural network, with a single hidden layer unit and sigmoidal activation unit, is used as a spark-voltage vector classifier.

In a supervised training paradigm, a back-propagation learning algorithm sets the MLP training. The training file contains $N_t$ pairs input-output; model input is an instantaneous spark-voltage vector of the form $V_i=(v_1, v_2, \ldots, v_m)$, with $i=1, \ldots, N_t$ and m equal to the length of the spark-voltage vector; model output is a desired output vector of the form $D_r=(0,0,1)$, $D_{stoi}=(0,1,0)$ and $D_l=(1,0,0)$, depending on whether the lambda value, associated to the current spark-voltage vector, is rich (<1), stoichiometric ($\approx$1) or lean (>1).

Three sets of spark-voltage vectors and their associated desired output vectors build the training file. Similar files, built by data not to be used for training, are created for validation and test purposes. In this case, during the testing phase, to estimate the model forecast capability it is sufficient to count the number of times in which model output doesn't match the desired output value. The ratio between this number and the total number of estimates represents the model classification error. An alternative quantity for describing the model forecast capability can be simply obtained as difference between 1 and the classification error. This alternative quantity is usually called correct classification rate.

R. J. Howlett et al. [8], [9] carried out a multi-speed test with the same 92 cc single-cylinder four-stroke engine. In this case, they used a more closely-spaced range of lambda values, i.e. 0.9, 1.0 and 1.1. FIG. 7 shows the trend of the correct classification rate of the virtual lambda sensor model versus engine speed for various model training file sizes. The normalized size of the training file $\sigma$, used in this test, satisfies the following relationship $N_t=N_w\sigma$ where $N_t$ is the size of training file and $N_w$ is the number of weights of the MLP neural network modeling virtual lambda sensor.

These approaches have important drawbacks. The above virtual lambda sensors are unable to indicate the actual AFR but only if the AFR is in one or the other range. In other words, they cannot confirm lambda values approximately equal to 0.95 or 1.05 as illustrated by the rectangles in FIG. 8.

The number of cycles of integration, according to the approach aimed at reducing the effect of random variations observed in successive spark waveforms, is not specified. However, this would be an important parameter when realizing a fast gasoline engine injection control system.

The forecast capability of the system of R. J. Howlett et al. [8-9] has a strong dependence on engine speed.

It has been shown [20] that at an MBT condition (Maximum spark advance, evaluated in respect to the TDC for the Best Torque) the pressure peak in a cylinder during combustion is correlated with the air/fuel ratio, while the location of the pressure peak at a fixed air/fuel ratio value is correlated with the spark advance. Therefore, it is possible to regulate the air/fuel ratio at stoichiometric conditions simply by correcting the fuel injection to keep constant the position of the crank at which the pressure peak is attained, and keeping the pressure peak at a certain value.

The so-called MBT condition is the operating condition of the engine when the spark advance takes on the maximum value before bringing the engine toward the knocking phenomena. Normally, this condition is not often verified during the functioning of the engine.

In [20], a neural network for sensing the position of the crank when the pressure peak occurs (that is the Location of the Pressure Peak, or briefly the LPP parameter) and the pressure peak value (briefly, the PP parameter) is also disclosed. This neural network is embodied in an air/fuel ratio feedback regulator, and provides to a control system of the engine, signals representing the LPP and the PP parameters. This control system drives the motor in order to keep constant the LPP parameter and to keep constant the air/fuel ratio by regulating the pressure peak in the cylinders.

Unfortunately, this document though establishing that there is only a relationship between the air/fuel ratio and the pressure peak if the LPP parameter of the motor is constant (in particular, if the LPP parameter corresponds to the value for MBT condition), is silent about any possibility of assessing the actual air/fuel ratio as a function of the pressure peak without employing a classic lambda sensor under any condition of operation of the engine.

As a matter of fact, the correlation between the pressure peak and the air/fuel ratio has been demonstrated only in steady-states at certain operating conditions, that is, at MBT conditions, at 2000 rpm and MAP of 0.5 and 0.8 bar.

The system disclosed in that document does not lend itself for sensing the air/fuel ratio, that is for generating a signal that represents at each instant the current value of the air/fuel ratio of the engine.

Therefore, the need remains for a low cost manner of sensing the air/fuel ratio with a sufficient accuracy under any condition of operation of the engine.

SUMMARY OF THE INVENTION

It has been found a method of sensing the air/fuel ratio in a combustion chamber of an internal combustion engine that may be easily implemented by a respective low-cost device.

The device of the invention has a pressure sensor and a learning machine that generates a sensing signal representing the air/fuel ratio by processing the waveform of the pressure in at least one cylinder of the engine. In practice, the learning machine extracts characteristic parameters of the waveform of the pressure and as a function of a certain number of them generates the sensing signal.

Surprisingly, the device of this invention is even more accurate than the classic lambda sensors in any operating condition of the engine.

The characteristic parameters to be used for sensing the air/fuel ratio are preferably averaged on a certain number of pressure cycles, for reducing noise and improving the accuracy of the sensing. This certain number of pressure cycles is established by using a clustering algorithm on a data set comprising various moving averages of these parameters carried out on different number of pressure cycles.

According to an innovative aspect, the learning machine of the device for sensing the air/fuel ratio is based on a kind of neural network, herein referred as MultiSpread-PNN. An appropriate method of training such a neural network is also disclosed.

Another aspect is directed to a device for sensing the air/fuel ratio in a combustion chamber of an internal combustion engine. The device may include a pressure sensor generating a pressure signal of the pressure in at least a cylinder of the engine, and an offline trained learning machine input with the pressure signal, extracting from characteristic parameters thereof and generating as a function of the characteristic parameters a signal representative of the air/fuel ratio of the engine.

BRIEF DESCRIPTION OF THE DRAWINGS

The different aspects and advantages of the invention will become even clearer through a detailed description of practical embodiments referring to the attached drawings, wherein.

DETAILED DESCRIPTION OF THE PREFERRED EMBODIMENTS

Figure 1:
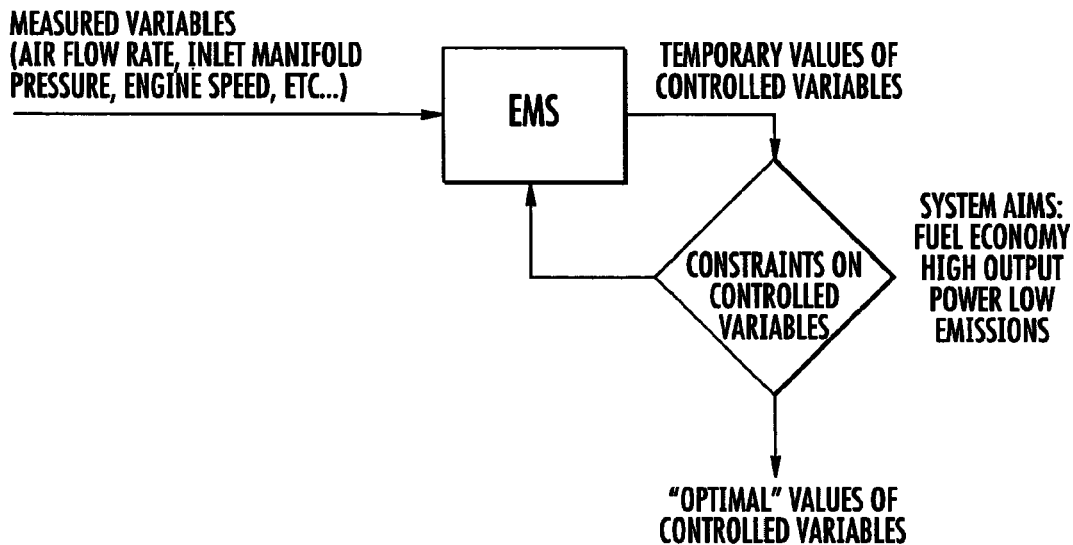
FIG. 1 is a block diagram that illustrates schematically a control of an internal combustion engine by means of an Engine Management System as in the prior art.
Figure 2:
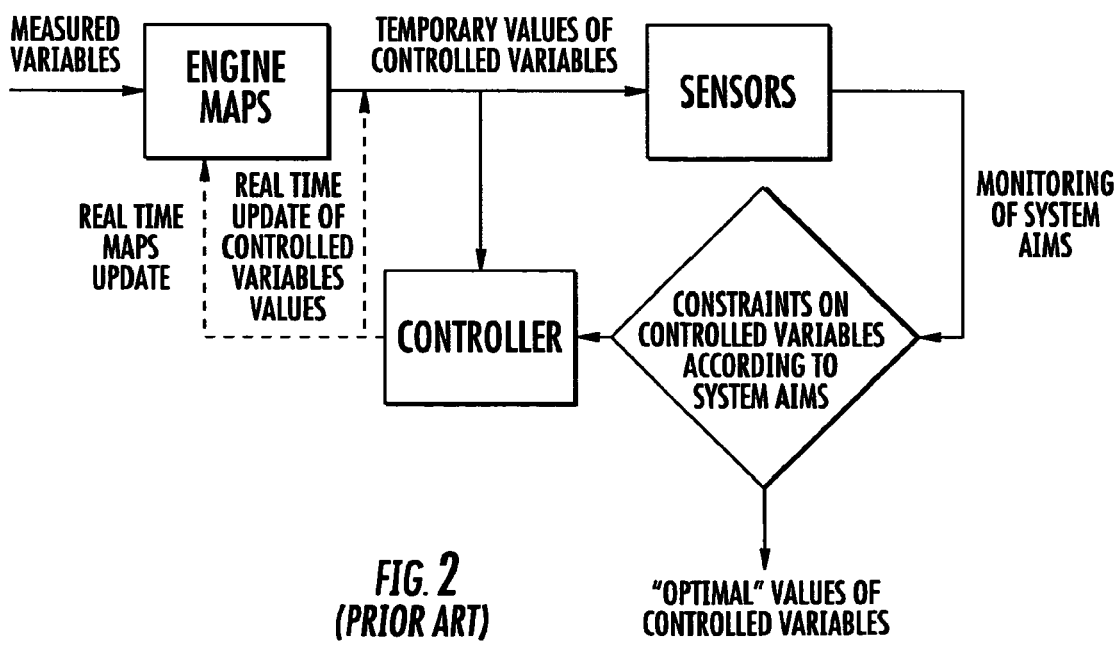
FIG. 2 is a block diagram of an Engine Management System as in the prior art.
Figure 3:
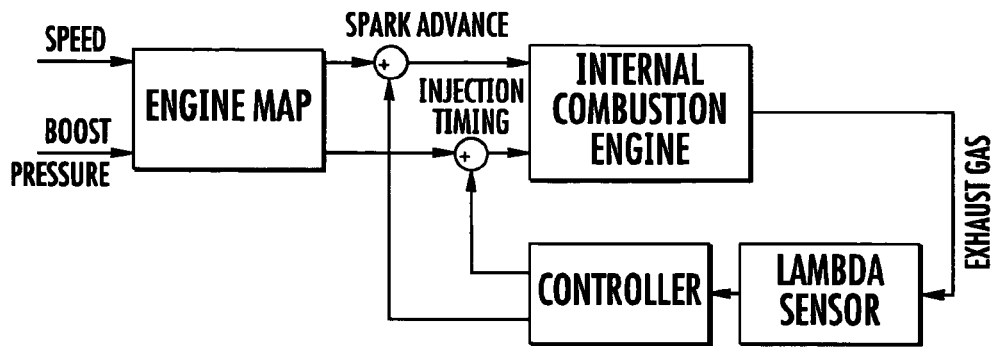
FIG. 3 illustrates an Engine Management System for a spark ignition engine as in the prior art.
Figure 4:
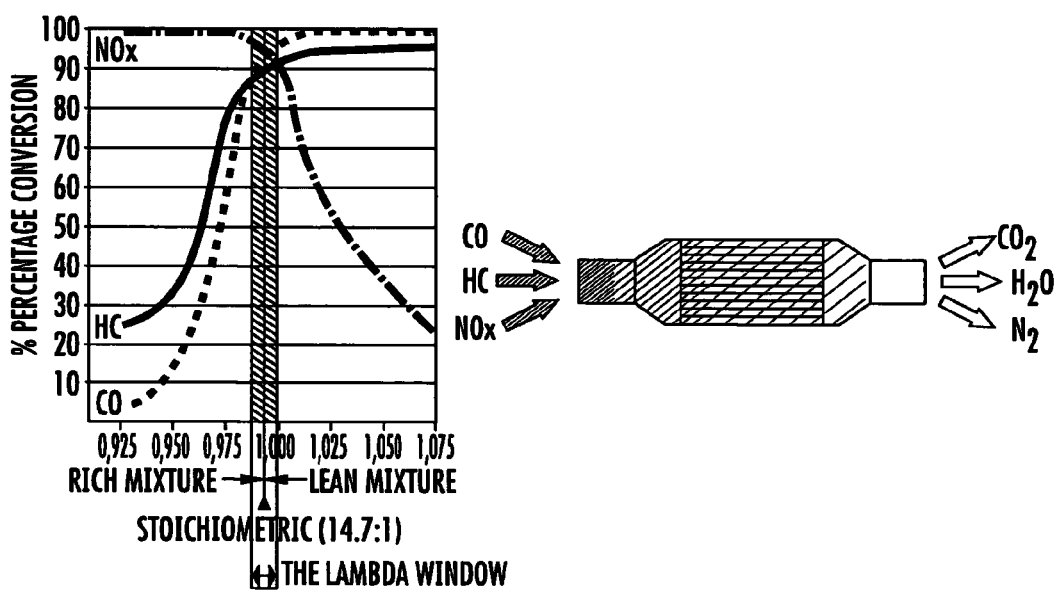
FIG. 4 is a graph that illustrates the conversion percentages of exhaust gases of the engine as a function of the air/fuel ratio as in the prior art.
Figure 5:
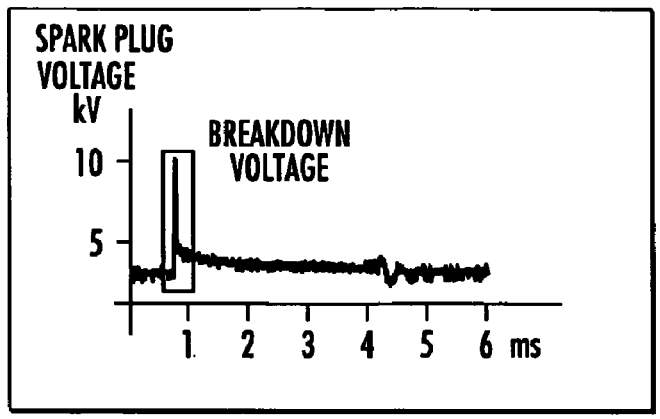
FIG. 5 depicts a simple spark voltage waveform of an internal combustion engine as in the prior art.
Figure 6:
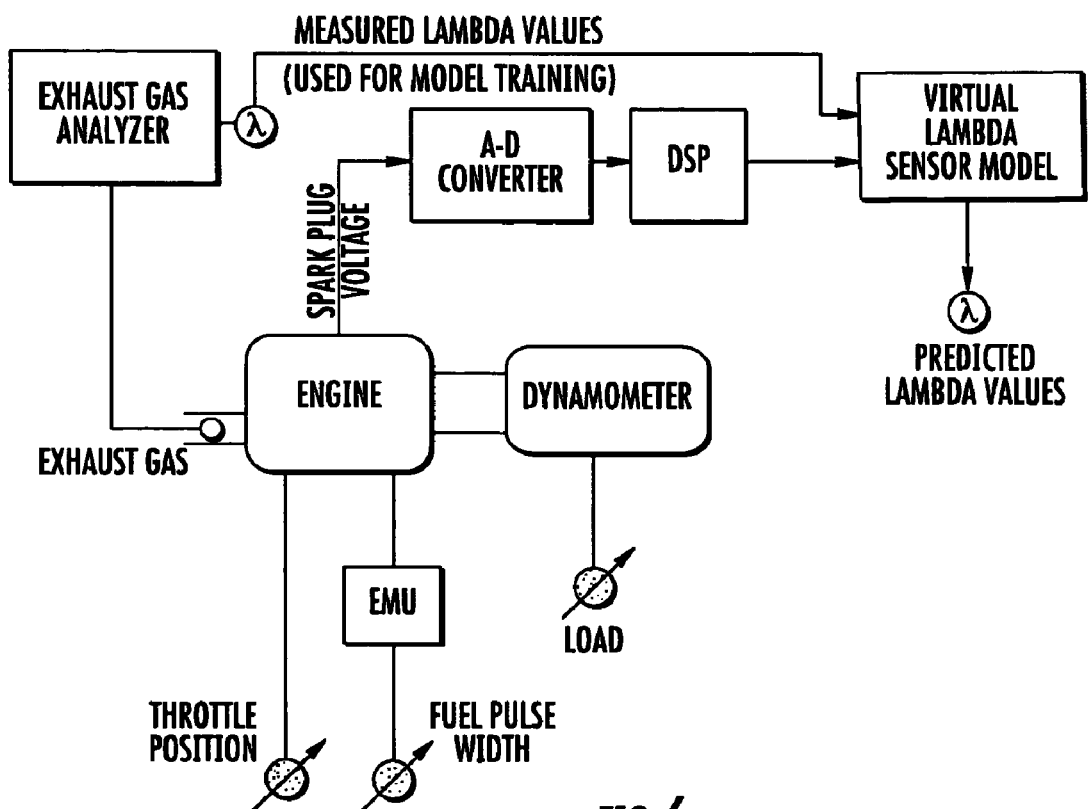
FIG. 6 depicts an arrangement for training a lambda sensor based on a neural network as in the prior art.
Figure 7:
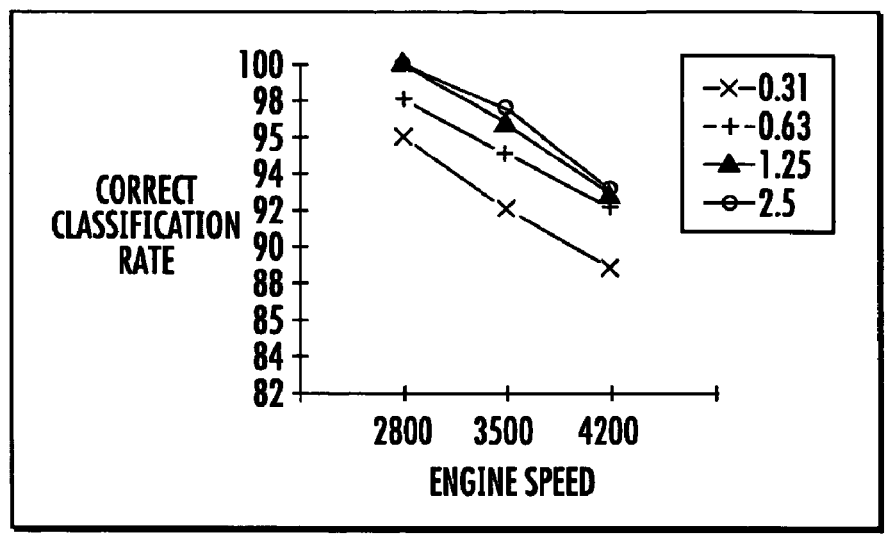
FIG. 7 illustrates how the correct classification rate of the lambda sensor of FIG. 6 varies as a function of the engine speed as in the prior art.
Figure 8:
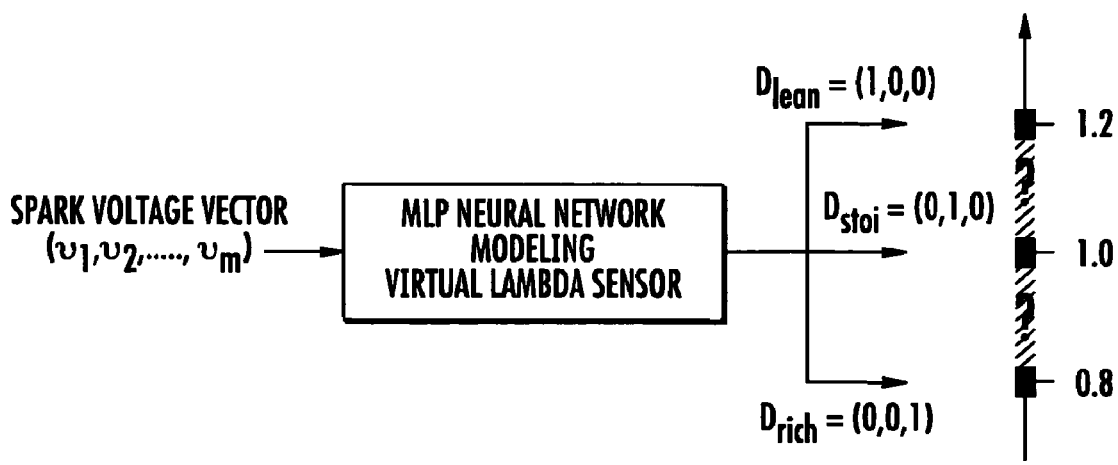
FIG. 8 shows schematically how a Multi-Layer Perceptron neural network of FIG. 6 determines the air/fuel ratio of an internal combustion engine as in the prior art.
Figure 9:
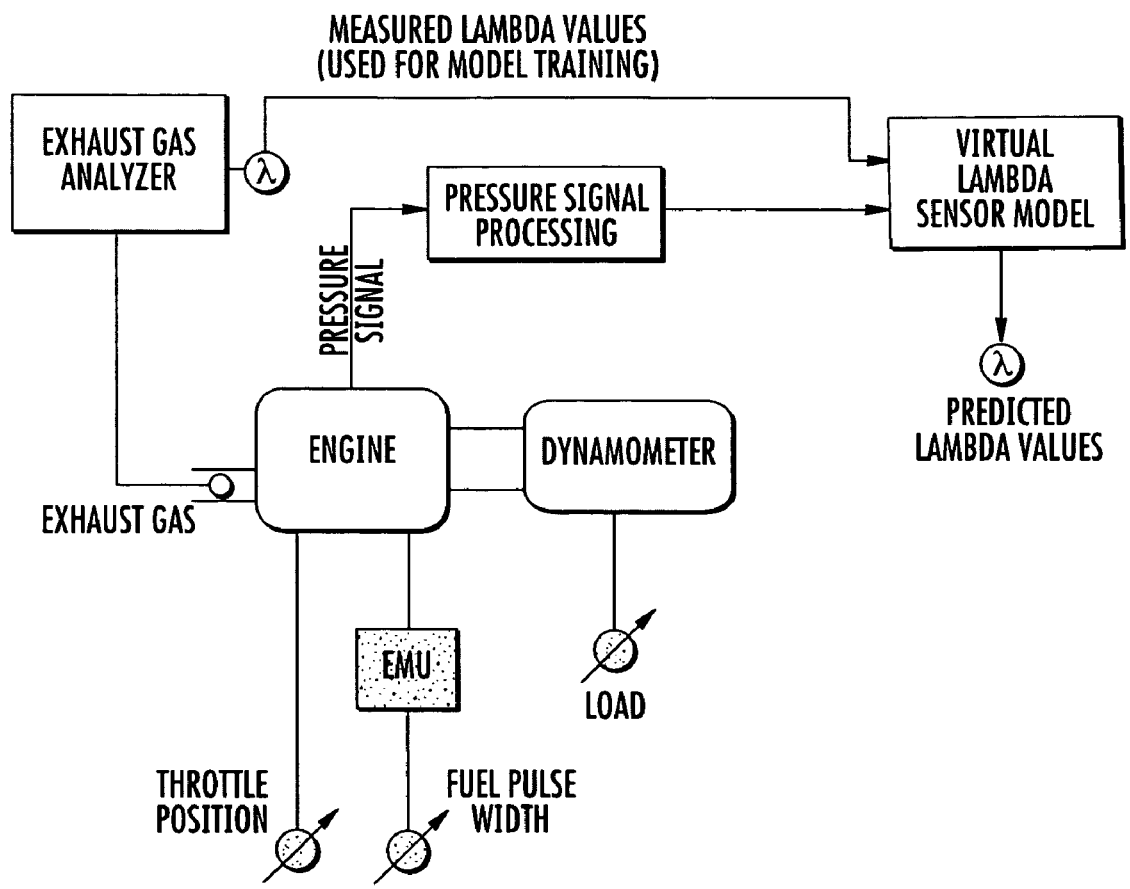
FIG. 9 depicts an arrangement of this invention for training a lambda sensor based on a learning machine.
Figure 10A:
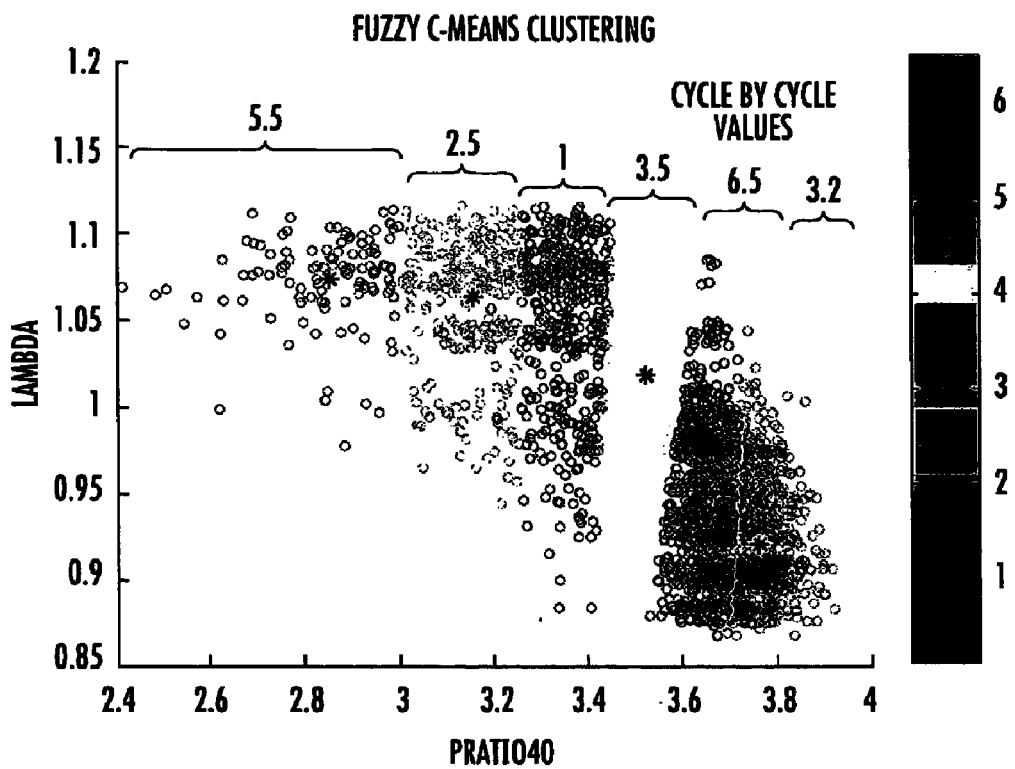
FIG. 10a to 10d are graphs that show results of a clustering algorithm on the values of the parameter Pratio40 sensed at each pressure cycle, averaged on five, ten and fifteen pressure cycles, respectively, as in the invention.
Figure 10B:
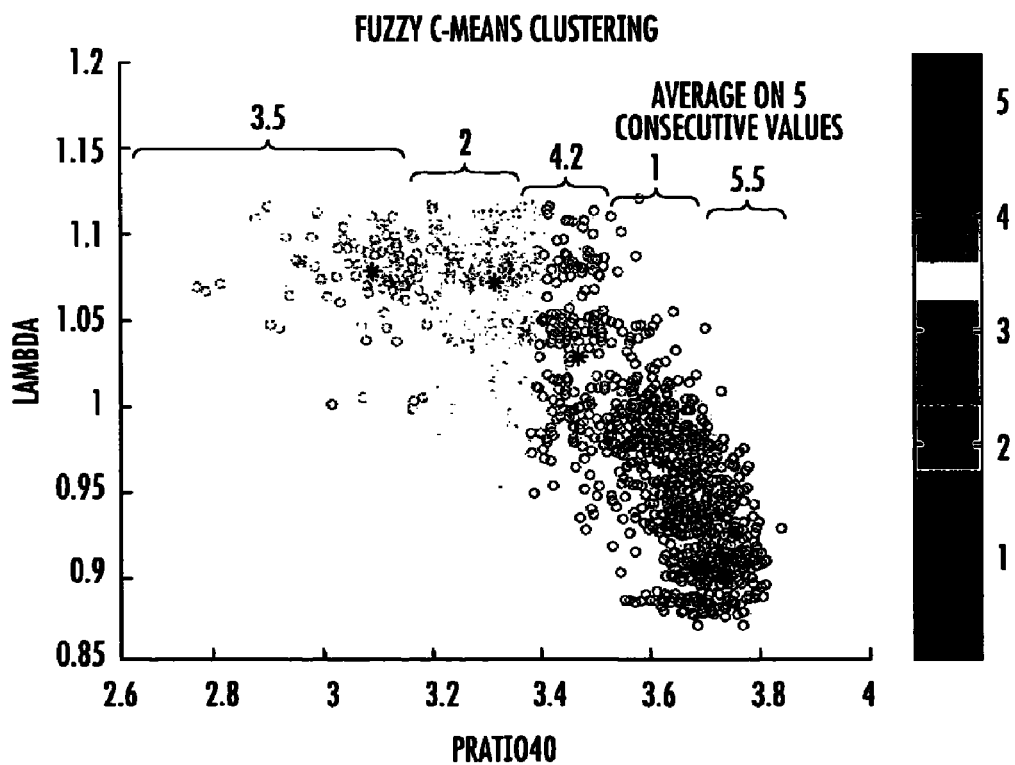
Figure 10C:
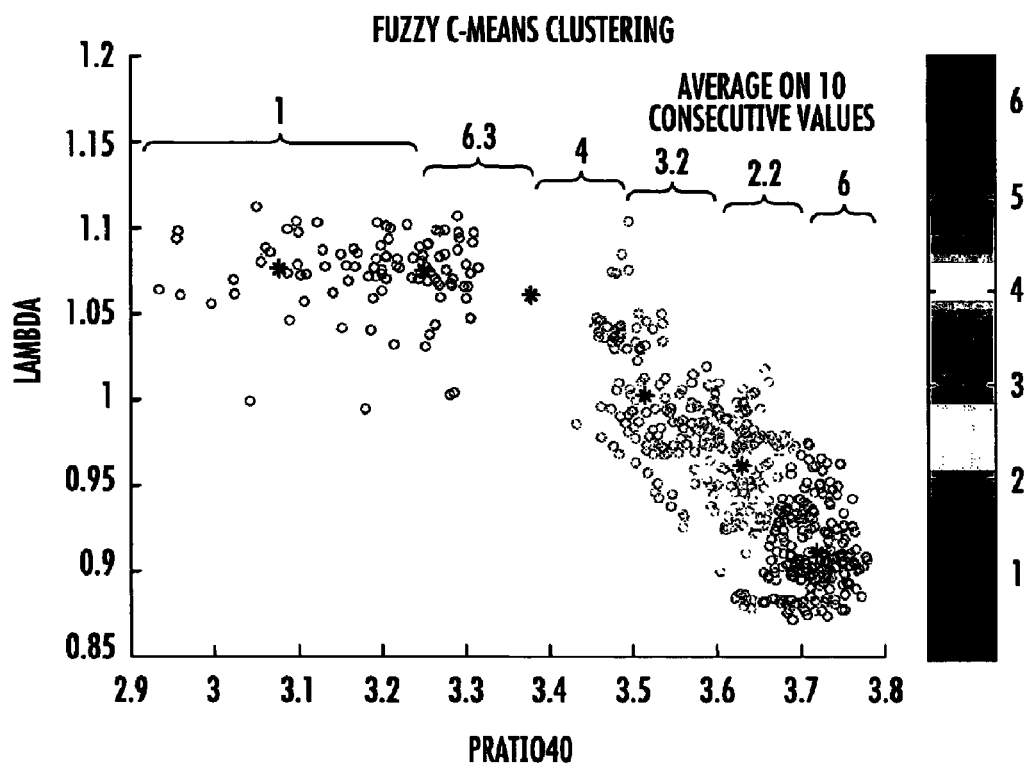
Figure 10D:
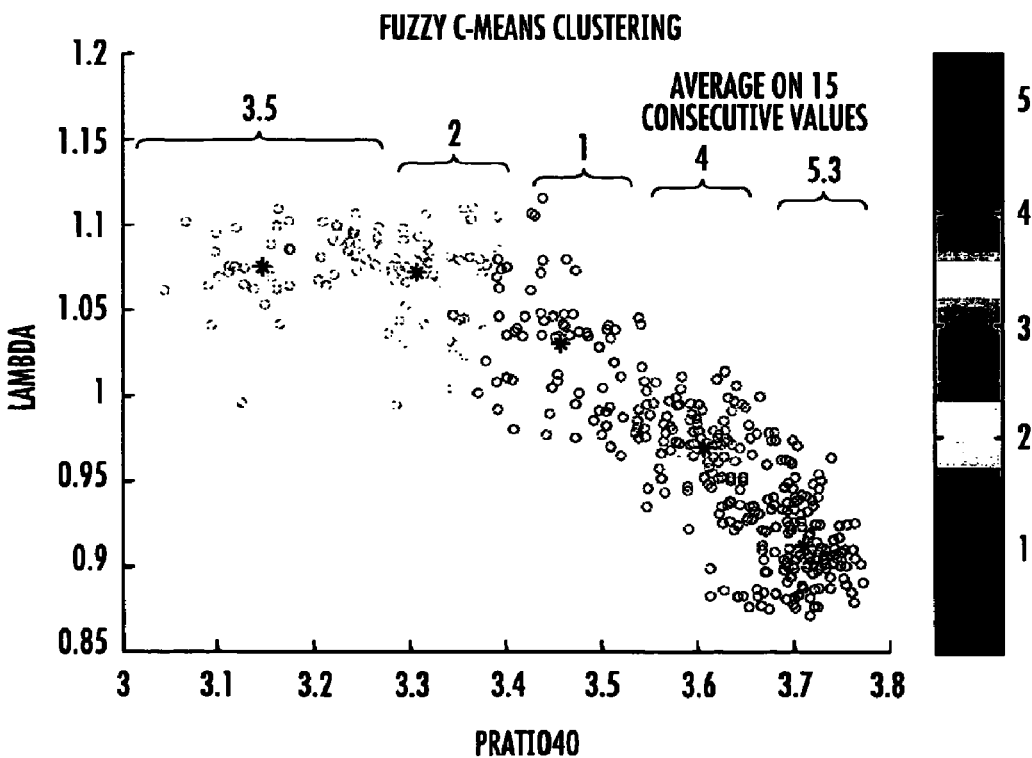

According to this invention, the inputs for modeling a virtual lambda sensor are obtained from an engine cylinder pressure signal generated by a pressure sensor, such as for instance the integrated pressure sensor disclosed in [21]. According to the invention, a virtual device capable of sensing the air/fuel ratio is based on a learning machine trained according to the scheme of FIG. 9.

Of course, it is possible to train the learning machine using also characteristics of other signals (the speed of the engine, for instance) in addition to the characteristics of the waveform of the pressure in a cylinder, but surprisingly it has been found that the pressure waveform features alone permit to achieve an outstandingly accurate assessment of the air/fuel ratio.

Indeed, a wealth of operating parameters of the engine could be extracted from the waveform of pressure in a cylinder. Of course, it is not convenient to consider all of them because the computational load of the learning machine would become excessive.

A sample set of characteristic parameters that are correlated with the air/fuel ratio are resumed in the following table

|  | unit of measure | element description |
| --- | --- | --- |
| Speed | rpm | engine speed |
| lambda | [ ] | lambda values |
| Aircycle | mg/cycle | air massive flow |
| BstMap | bar | intake manifold pressure |
| BurDur | deg | combustion duration |
| pEVC | bar | pressure at exhaust valve closure |
| pEVO | bar | pressure at exhaust valve opening |
| pIVC | bar | pressure at intake valve closure |
| pIVO | bar | pressure at intake valve opening |
| Pratio40 | [ ] | pressure ratio between pressures at 40 crank angles before and after TDC |
| Pratio50 | [ ] | pressure ratio between pressures at 50 crank angles before and after TDC |
| Pratio60 | [ ] | pressure ratio between pressures at 60 crank angles before and after TDC |
| Pratio70 | [ ] | pressure ratio between pressures at 70 crank angles before and after TDC |
| Pratio80 | [ ] | pressure ratio between pressures at 80 crank angles before and after TDC |
| Pratio90 | [ ] | pressure ratio between pressures at 90 crank angles before and after TDC |
| Pratio100 | [ ] | pressure ratio between pressures at 100 crank angles before and after TDC |
| Pratio110 | [ ] | pressure ratio between pressures at 110 crank angles before and after TDC |

-continued

| | unit of measure | element description |
|---|---|---|
| Pmax | bar | maximum pressure |
| PcompMax | [ ] | ratio between maximum of pressure cycle and maximum of pressure cycle without combustion |

These parameters have been identified as relevant for estimating the air/fuel ratio during extensive tests carried out on the commercial scooter engine: Yamaha YP125 (four stroke spark ignition engine with a displacement of 125 cc). The tests have been performed at several engine speeds, throttle positions, and spark advances, for considering all possible functioning conditions of the engine.

Given that a learning machine processing detected relevant parameters for estimating the air/flow ratio would be relatively slow, a small number of parameters to be used has been chosen.

A data pre-processing campaign was carried out to identify the parameters more correlated to the air/flow ratio (lambda value). During each pressure cycle all the above parameters were measured and the corresponding lambda value was sensed by a lambda sensor. The correlation of each parameter with the sensed air/fuel ratio was calculated, and only the three parameters that resulted most correlated with the air/fuel ratio as directly measured by the sensor were chosen as inputs of the learning machine.

Of course, it is possible to choose more than three parameters or even two or only one parameter as inputs of the learning machine, but the choice of three parameters appeared a good compromise. While choosing to use a larger number of parameters will increase the computational load, a too small number of parameters may impair the accuracy under varying functioning conditions of the engine.

The three parameters most correlated with the air/fuel ratio resulted to be Pratio40, Pratio50 and Pmax and, according to a preferred embodiment of this invention, these three parameters were used as the inputs of the learning machine.

In view of the fact that the values of these parameters as detectable may be corrupted by noise, it is advisable to use a moving average of the parameter calculated over a certain number of pressure cycles for estimating the air/fuel ratio.

A problem faced by the Applicants consisted in determining the number of detections values to be taken for calculating the moving average value to be used for the air/fuel ratio calculation. The larger is the number of successive samples, the more filtered from noise are the inputs of the learning machine, but the less prompt is the tracking of a time-changing air/fuel ratio.

In order to find the most effective approach, numerous moving averages with different numbers of samples of the three parameters have been calculated, and the moving average that resulted most correlated with the air/fuel ratio was chosen through a clustering analysis, that will be described in detail below.

FIGS. 10a to 10d show the results of a clustering process carried out among moving averages of the parameter Pratio40 calculated over different numbers of samples, and the corresponding λ value. It was experimentally determined that the larger the number of samples over which the moving average is carried out, the larger is the correlation between Pratio40 and the corresponding λ value.

In the graphs, each correlation is represented with a circle of pre-established radius and the circles of each cluster have the same color. From a mathematical point of view, this is equivalent to assume that small input variations generate small output variations, that is equivalent to assume that the air/fuel ratio depends on this parameter through a well-posed mathematical problem ([11], [12] and [13]).

A more detailed description of the Yamaha engine data set clustering analysis is presented in detail below. A novel factor, called "clustering factor", to compare how different data sets fit an user requested clusters number has been used and it has been found that the moving averages should be carried out on 16 successive samples for obtaining the best trade-off between noise filtering and tracking speed.

Clustering Factor of M-Dimensional Data

Clustering is an important processing tool used in different scientific fields, e.g. the compression of audio and video signals, pattern recognition, computer vision, recognition of medical images, etc. Clustering may be used for data pre-processing too. For example, it can be exploited for optimizing the learning of neural network models or/and to verify data pre-classifications.

There are two kinds of data distribution which can be clustered: data sequences and data ensembles. Data sequence means data come from a temporal sampling, e.g. a signal temporal sampling, or also the temporal sequence of engine pressure cycles. On the other hand, data ensemble means data (in an M-dimensional space) that are not temporally linked.

There are several clustering algorithms [22], for each of them there is a different approach to find the "optimal data clustering". But what does the word "clustering" means?

Let a data set of N points in the space $R^m$, $X = x_1, \ldots, x_N$, clustering of X involves a "natural" partition of the ensemble in $1 < c < N$ sub-structures. There are three different ways to obtain these c sub-structures in a given data set. Each way defines suitably the membership matrix (c×N matrix) of X elements versus c clusters. The membership matrix is built by the c×N matrix $U_{ik}$ being $k=1, \ldots, N$ and $i=1, \ldots, c$.

$U_{ik}$ elements are suitably linked to the distances of X points from c temporary cluster centers.

$$M_P = \{0 \leq U_{ik} \leq 1 \; \forall i, k \; \forall k \exists i \,|\, U_{ik} > 0\} \tag{1}$$

$$M_F = \left\{\sum_{i=1}^{c} U_{ik} = 1 \; \forall k \sum_{k=1}^{N} U_{ik} > 0 \; \forall i\right\} \tag{2}$$

$$M_C = \{U_{ik} = 0 \text{ or } 1 \forall i, k\} \tag{3}$$

The equations (1), (2) e (3) describe the three feasible membership matrices. In $M_P = M_{possibilistic}$, $U_{ik}$ element is the possibility (typicality) that $x_k$ point belongs to the i-th sub-structure. In $M_F = M_{fuzzy}$, $U_{ik}$ element corresponds to the membership probability of $x_k$ point to the i-th sub-structure; these probabilities satisfy for each k a normalization condition. Finally, $M_C = M_{crisp}$ is a Boolean matrix in which each element $U_{ik} = 1$ if and only if $x_k$ belongs to the current sub-structure. The three matrices are related by the following relation:

$$M_{crisp} \subset M_{fuzzy} \subset M_{possibilistic} \tag{4}$$

Finding the "optimal partition" of a data set X means to find the matrix $U_{ik}$ which better represents the unknown substructures of X in comparison to the clustering model that the algorithm induces.

Given a data set clustering, we need to introduce some criterions to appraise it.

Moreover, other criterions are needed in order to find what strategies to be followed for improving it. Concerning the first of these requests, there are not objective criterions to appraise a data set clustering; in fact, the current criterions depend on the application.

To improve a data set clustering, the more used approach is based on an iterative solution searching. An exhaustive solution searching, in the space of the possible solutions, could be too much onerous from a computational viewpoint. Indeed, the total number of partitions in c classes of a data set with N elements is $c^N/c!$. A sub-optimal approach allows for each iteration to improve the solution going to optimize the selected criterion.

Even if the approach does not guarantee the attainment of the absolute optimal solution, it often is used for its low computational complexity. However, a relevant problem of similar approaches is the sensibility to the initial choosing of the clusters.

Two clustering algorithm (FCM and FPCM) implementations will be described. The performances of the two algorithms have been compared on a data set obtained from the pressure cycles of the Yamaha YP125 gasoline engine. After having identified the algorithm features, the algorithms are implemented on a space of M-dimensional data. Besides, the influence of the cluster center vector initialization has been analyzed keeping in mind the theoretical results in [22]. At last, a clustering degree measure of a data set X, called "clustering factor" is proposed. This factor seems able to compare the induced clusterings on several data sets $X_{(i)}$ for a fixed choosing of the number of sub-structures to be found.

Fuzzy C-Means Algorithm (FCM)

The FCM algorithm is based on Fuzzy System Theory which is used as a precious mathematical tool in several application fields. A fuzzy set is an element set with a "blurred" membership concept. FCM is an iterative procedure based on the idea that clusters can be handled as fuzzy sets. Each point $x_k$ (with k=1, ..., N) may belong at the same time to different clusters with membership degrees $U_{kj}$ (with j=1, ..., c) which change during the procedure. There is only a constraint: for each element $x_k$ and for each algorithm step, the sum of membership degrees must be equal to 1.

From a mathematical perspective, the FCM clustering model can be described as an optimization problem with constraints. The objective function to be minimized is:

$$J_m(U, V) = \sum_{i=1}^{c} \sum_{k=1}^{N} U_{ik}^m D_{ik}^2 \tag{5}$$

The following constraints are associated to the function (5):

$$\sum_{i=1}^{c} U_{ik} = 1 \ \forall k = 1, ..., N \tag{6}$$

In eq. (5) m is the system fuzzyness degree while $D_{ik}$ matrix represents the distances between distribution points ($x_k$) and cluster centers ($v_i$). For m=0 the fuzzy clusters become classical clusters, that is, each sample belongs only to a cluster. For m>>0 the system fuzzyness level grows. If m→∞ we can observe that the membership degrees of data set points approach to 1/c and cluster centers approach to the distribution center. The FCM algorithm optimizes a criterion which is the "fuzzy" version of the "trace criterion" [23]. Since the algorithm depends by the initial cluster centers, we implemented it considering this. In fact, user can choice the initialization way (stochastic and deterministic) of the cluster centers.

The FCM procedure can be executed for several clustering strategies of data set X, that is, for different number of clusters (from $c_{min}$ to $c_{max}$). The final result will be a sequence of $J_{min}(c)$ (with c=$c_{min}$, ..., $c_{max}$), each of theme is the function (5) minimum.

There is a performance index P(c), given by eq. (7), by which it is possible to find the "optimal" number of clusters.

$$P(c) = \tilde{J}_{min}(c) - \sum_{i=1}^{c} \sum_{k=1}^{N} U_{ik}^m \cdot \|\bar{x} - v_i\| \tag{7}$$

The "optimal" number of clusters $c_{opt}$: is one minimizes the performance index P(c).

Figure 11:
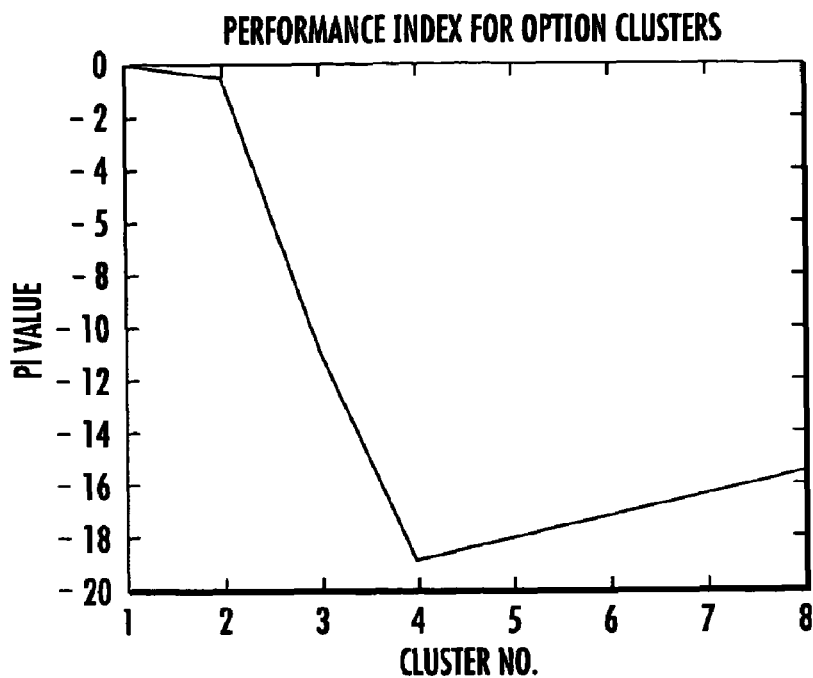
FIG. 11 is a sample graph of the performance index of a chosen clustering algorithm as a function of the number of clusters in which data are grouped as in the invention.

P(c) has a minimum when data set clustering has a minimum intra-cluster variance (i.e. small values of $D_{ik}$ in e $\tilde{J}_{min}$(c)) and a maximum inter-cluster variance (i.e. maximum cluster center distances $v_i$ from data set centers $\bar{x}$). Hence, a graph of the performance index versus the number of clusters may be plot. FIG. 11 shows a given data set grouped with different numbers of clusters (c=2, ..., 8).

Even looking at FIG. 11 it is possible to see that the best data set clustering is obtained with four clusters.

Fuzzy Possibilistic C-Means Algorithm (FPCM)

The FCM is of course a useful data pre-processing tool, but it is burdened by the drawback of being sensible to noisy data and to the outlier problem (see [22] and [24]). There is a lot of clustering algorithms which try to solve these problems, as in [25] and [26].

In this FPCM implementation, the Bezdek approach disclosed in [22] has been used. The main feature of this approach consists in using another grouping strategy called typicality. Basically, while the membership degree is a "local" grouping feature, that is, $x_k$ has a probability of belonging to c clusters normalized to 1, the typicality is a grouping feature involved by the same clusters. In other words, it is supposed that the clustering ways of a data set X are established by an observer.

For the FCM, the observer is, for every time, in $x_k$ point. In this case, the observer thinks to set his membership to c temporary sub-structures with a probability inversely proportional to his distances from cluster centers. There is only a constraint: the membership degrees are normalized to 1.

For the FPCM, the observer is not, for every time, only in $x_k$ point but also in the i-th cluster center; in this last case, he thinks to set the membership of all X points to the current cluster with a probability inversely proportional to the distances of X points from the observer. There is only a constraint: the typicality degrees are normalized to 1 according to 8.

$$\sum_{k=1}^{N} T_{ik} = 1 \ \forall i = 1, ..., c \tag{8}$$

From a mathematical viewpoint, the FPCM clustering model can be described as an optimization problem with constraints. The objective function to be minimized is:

$$J_{m,\eta}(U, T, V) = \sum_{i=1}^{c} \sum_{k=1}^{N} (u_{ik}^m + t_{ik}^\eta) D_{ik}^2 \tag{9}$$

The following constraints are associated to the function (9):

$$\sum_{i=1}^{c} U_{ik} = 1 \quad \forall k \tag{10}$$

$$\sum_{k=1}^{N} T_{ik} = 1 \quad \forall i \tag{11}$$

In eq. (9) m and η are the system fuzzyness degree. Since the algorithm depends on the initial centers of clusters, we implemented it considering this. In fact, an user can choose the initialization way (stochastic or deterministic) of the cluster centers.

Data Set Clustering Factor

The innovation consists in the introduction of a measure of the clustering degree of a given data set X, called "clustering factor". This factor is useful to compare the same clustering on several data sets. The idea is to divide the performance index P(c) given by eq. (7) by its asymptotic behavior $P_{asym.}(c)$. $P_{asym.}(c)$ is P(c) estimated when data set clustering is "ideal". "Ideal" clustering means that the grouping of data set points is in sub-structures with the minimum intra-cluster variances (i.e. data set points falling on the cluster centers) and the maximum inter-cluster variances (i.e. maximum difference of the features, that is, maximum distances of the cluster centers from data set centers).

For an "ideal" clustering, supposing that $n_i$ points, amongst data set elements, fall on i-th cluster (with $i=1, \ldots, c$), the membership and typicality matrices ($U_{ik}$ and $T_{ik}$) take the following form:

$$\begin{pmatrix} 0 & 1 & 0 & 1 & 0 & . & . & 0 \\ 1 & 0 & 0 & 0 & 0 & . & . & 1 \\ 0 & 0 & 0 & 0 & 1 & . & . & 1 \\ . & . & . & . & . & . & . & . \\ . & . & . & . & . & . & . & . \\ 0 & 0 & 1 & 0 & 0 & . & . & 0 \end{pmatrix} \tag{12}$$

$$\begin{pmatrix} 0 & \frac{1}{n_1} & 0 & \frac{1}{n_1} & 0 & . & . & 0 \\ \frac{1}{n_2} & 0 & 0 & 0 & 0 & . & . & 0 \\ 0 & 0 & 0 & 0 & \frac{1}{n_3} & . & . & \frac{1}{n_3} \\ . & . & . & . & . & . & . & . \\ . & . & . & . & . & . & . & . \\ 0 & 0 & \frac{1}{n_c} & 0 & 0 & . & . & 0 \end{pmatrix} \tag{13}$$

Data set points $n_i$ falling on c clusters must satisfy the constraint:

$$\sum_{i=1}^{c} n_i = N \tag{14}$$

The N elements of a data set can fall in c clusters in $c^N/c!$ different ways. Each falling way must satisfy the constraint in eq. (14). This means that the number of the "ideal" partitions of data set in c sub-structures is equal to $c^N/c!$. To build $P_{asint.}(c)$ amongst the $c^N/c!$ "ideal" partitions, we choose that whereby $$n_1 = n_2 = \ldots = n_c = \frac{N}{c} \tag{15}$$

Considering eqs. (12), (13), (14) and (15) it is simple to obtain the asymptotic performance index of the FCM and FPCM algorithms ($P_{asint.}^{FCM}(c)$ and $P_{asint.}^{FCM}(c)$):

$$P_{asini.}^{FCM}(c) = -\sum_{k=1}^{N} \|\vec{x} - v_i\|^2 \tag{16}$$

$$P_{asini.}^{FPCM}(c) = -\left(\frac{N}{c} + \left(\frac{c}{N}\right)^{\eta-1}\right) \cdot \sum_{k=1}^{N} \|\vec{x} - v_i\|^2 \tag{16}$$

To obtain the "clustering factor" of a data set it is necessary to divide the performance index by its asymptotic form. "Clustering factor" is always in [0, 1]. It is able to recognize amongst several data sets $X_i$, which have been clustered by the same clustering algorithm and according to the same user requested number of clusters, the one which better fits the "ideal" clustering in c sub-structures.

Data Set Pre-Processing

The considered data set was a data ensemble extracted from the pressure cycles of the test engine. Pre-processing of the data set, by FCM and FPCM clustering algorithms, found the inputs most correlated to the model output (lambda values) but also found the number of the pressure cycle instantaneous values that were to be averaged to obtain the best correlation between VLS inputs and output.

The clustering process between Pratio40 (a possible input of the VLS model) and λ versus the number of the pressure cycle instantaneous values which we averaged on was analyzed by increasing the number of cycles, the correlation between Pratio40 and λ increases strongly.

The correlation between Pratio40 and λ does not increase indefinitely but has a maximum. The maximum was found when the number of successive pressure cycles (averaged samples) was 16. This was established with the "clustering factor".

Having fixed the model input (as Pratio40) and the cluster number to be induced in the data set (in this sample case, a partition of data set in 3 clusters is to be induced), the different data sets have been labeled with the respective number of pressure cycles on which each input parameter has been averaged.

Figure 12:
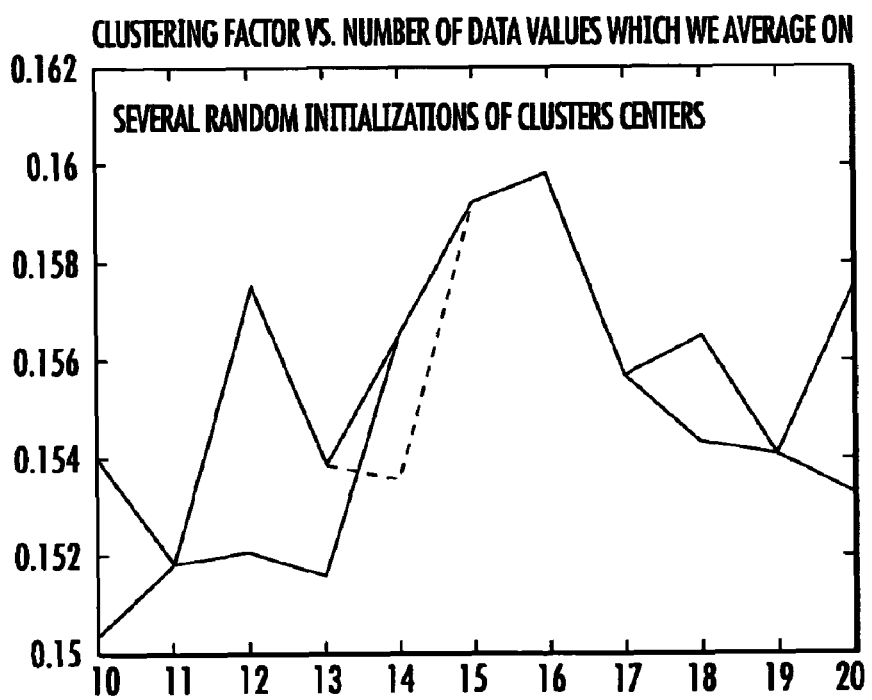
FIG. 12 is a sample graph of the clustering factor of a chosen clustering algorithm as a function of the number of samples used for calculating the moving averages on which the clustering algorithm is applied, for random initializations of the centers of the clusters, as in the invention.
Figure 13:
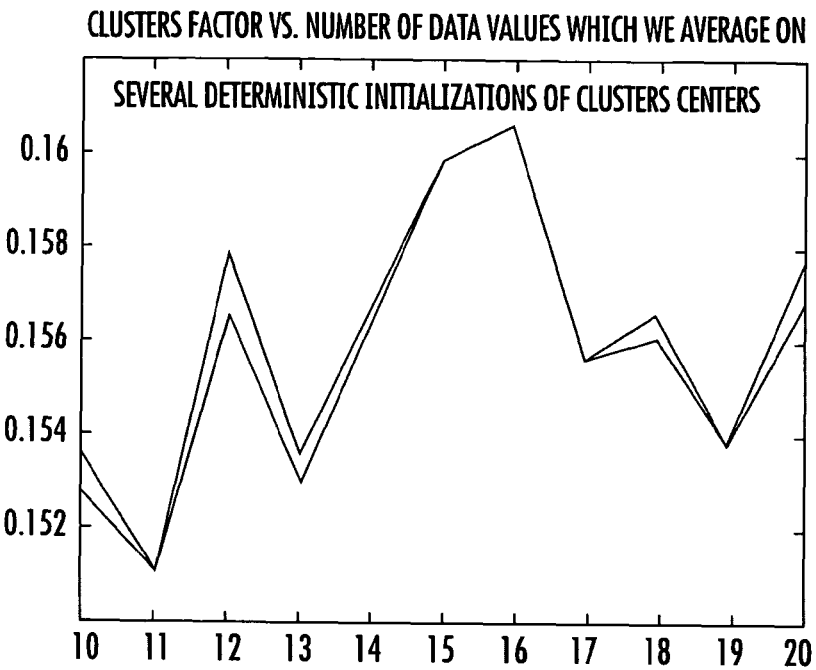
FIG. 13 is a sample graph of the clustering factor of a chosen clustering algorithm as a function of the number of samples used for calculating the moving averages on which the clustering algorithm is applied, for deterministic initializations of the centers of the clusters, as in the invention.

Several cluster center initializations have been used. FIGS. 12 and 13 are graphic representations obtained by simulations of values of clustering factor as a function of the number of samples on which parameters are averaged, for random and deterministic initialization of cluster centers, respectively. The maximum value of the "clustering factor" is attained for a number of the pressure cycles, on which each input parameter is to be averaged, equal to 16. Therefore, the characteristic parameters are best averaged on 16 pressure cycles, because this number better fits the clustering requested by the user.

Preferably, evolutionary algorithms are used to search the optimal design of a neural network model, which emulates an on-off lambda sensor.

In general, the clustering process of data sets depends on the scaling of data values.

Figure 14:
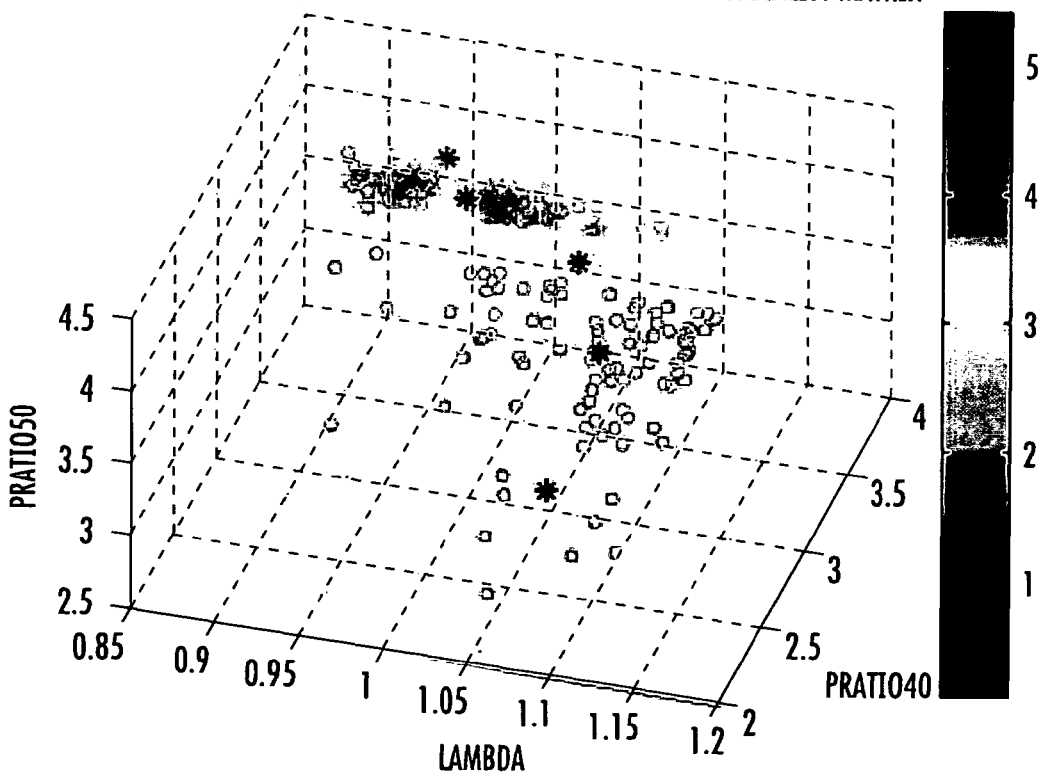
FIG. 14 is a graph showing a sample result of a chosen clustering algorithm on moving averages of the values of the parameters Pratio40, Pratio50 and on the value lambda of the air/fuel ratio, as in the invention.
Figure 15:
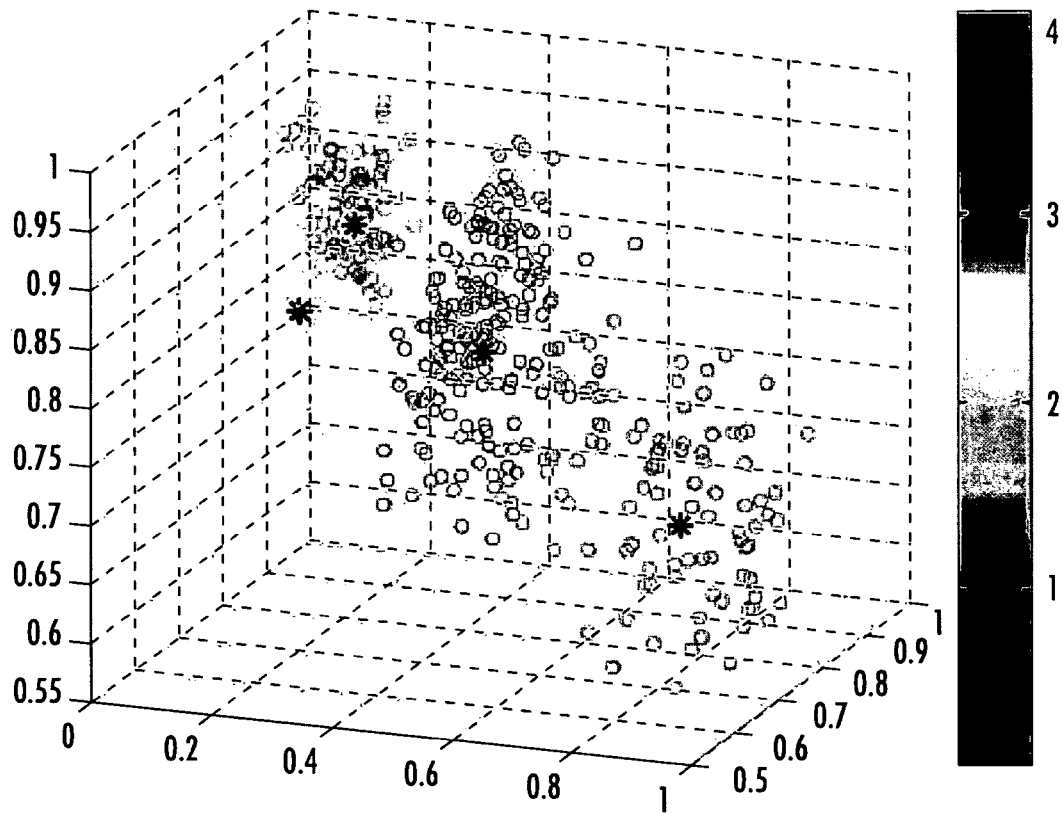
FIG. 15 is a graph normalized in the range [0; 1] showing a sample result of a chosen clustering algorithm on moving averages of the values of the parameters Pratio40, Pratio50 and on the value lambda of the air/fuel ratio, as in the invention.

Therefore, the algorithm input data should be previously normalized in [0, 1]. FIGS. 14 and 15 show the difference of the results that were obtained by the same algorithm executed on two different data sets. In the first data set, data (λ, Pratio40 and Pratio50 values) have values within different ranges, in fact Pratio40 and Pratio50 values are in [2, 4.5] while λ values are in [0.8, 1.2]. In the second data set, the same data are normalized in [0, 1]. The six clusters, selected by the clustering algorithm for the first data set, are arranged along Pratio40 axis. This indicates a data set grouping polarization induced by data component which has higher values. Instead, the four clusters selected by the algorithm in the second data set are arranged along the λ axis and they correspond to the three lambda values ranges useful to the setting-up of a VLS model: rich mixture range (orange and green cluster), stoichiometric range (brown cluster) and lean mixture range (blue cluster). Indeed, a model, which emulates effectively a real lambda sensor, must distinguish the three regions above mentioned in the input space. In this way, the model is almost able to forecast if the engine is above or below the stoichiometric region (i.e. emulation of an on-off lambda sensor).

There is a definitive difference between the computational complexity of the FCM and FPCM algorithms. Accordingly, the FCM could be chosen for decreasing the computing time. Moreover, the cluster centers initialization could slow down the algorithm convergence velocity.

In practice, there are several critical factors that limit the use of the clustering algorithms for data pre-processing in real time systems. On the other side, clustering algorithms remain an important tool for pre-processing data for the off-line learning of models, e.g. models having applications in the automotive field.

A Learning Machine

According to an embodiment of this invention, the learning machine is based on a new kind of working logic, substantially different from that of models proposed by R. J. Howlett et al.: such a learning machine is herein referred as Multi-Spread Probabilistic Neural Network.

Figure 16:
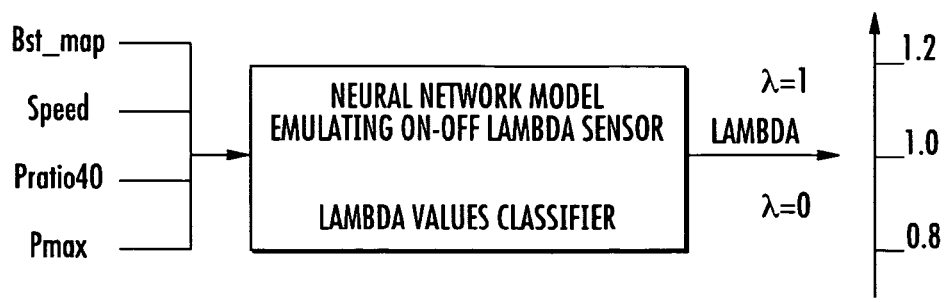
FIG. 16 shows schematically how a device of this invention based on a neural network of FIG. 9 for sensing the air/fuel ratio of an internal combustion engine works, as in the invention.
Figure 17:
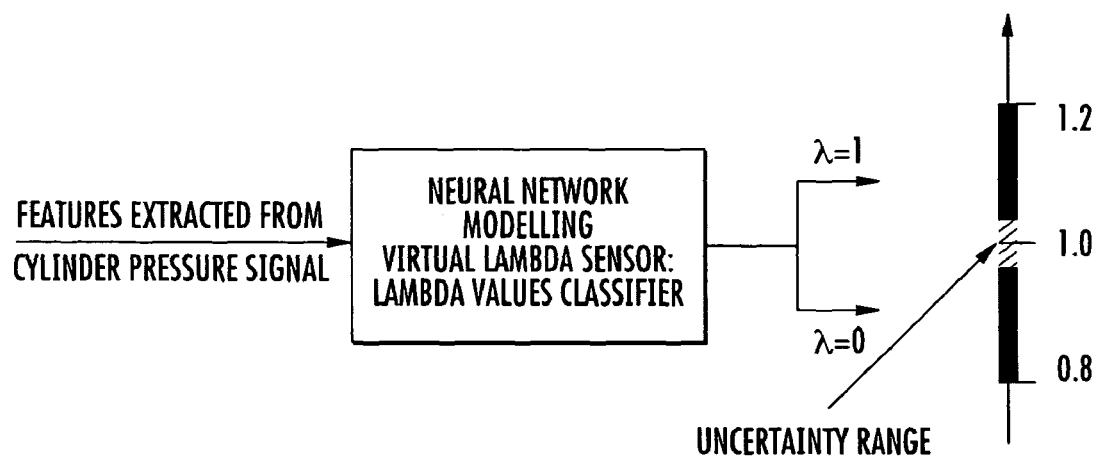
FIG. 17 highlights the incertitude range of the device of the invention.

As depicted in FIGS. 16 and 17, the gist of the model of virtual lambda sensor of this invention is to group lambda values in two classes: the class λ=1 in which lambda values are above the stoichiometric range and the class λ=0 in which lambda values are below the stoichiometric, according to inputs values selected by an initial data pre-processing phase.

Differently from the known models, incertitude region of the model of this invention is an extremely narrow range around the stoichiometric lambda (λ=1.0). According to the embodiment analyzed, this range corresponds to lambda values within 0.98 and 1.02.

In the incertitude region of the model of virtual lambda sensor of this invention, the model forecast capability is significantly lower than the forecast capability that the prior art models have in their working regions. By contrast, in the working regions (red rectangles in FIG. 17) the model of this invention has an outstanding forecast capability that is not tied bounded to a particular speed of engine nor to any particular position of the throttle.

From a mathematical viewpoint, a neural network with a scalar output can be described as an hyper-surface Γ in $R^{m+1}$ space, that is a map $s:R^m \to R^1$. In this formalism, the index m represents design space dimension. Neural network design can be described as a multivariable interpolation in high dimensional space. Given a set of N different points $\{x^{(i)} \in R^m | i=1, 2, \ldots, N\}$ and a corresponding set of N real numbers $\{d_i \in R^1 | i=1, 2, \ldots, N\}$, it is necessary to find a function $F:R^m \to R^1$ that satisfies the interpolation conditions:

$$F(x^{(i)})=d_i, i=1, 2, \ldots, N \qquad (17)$$

Figure 18:
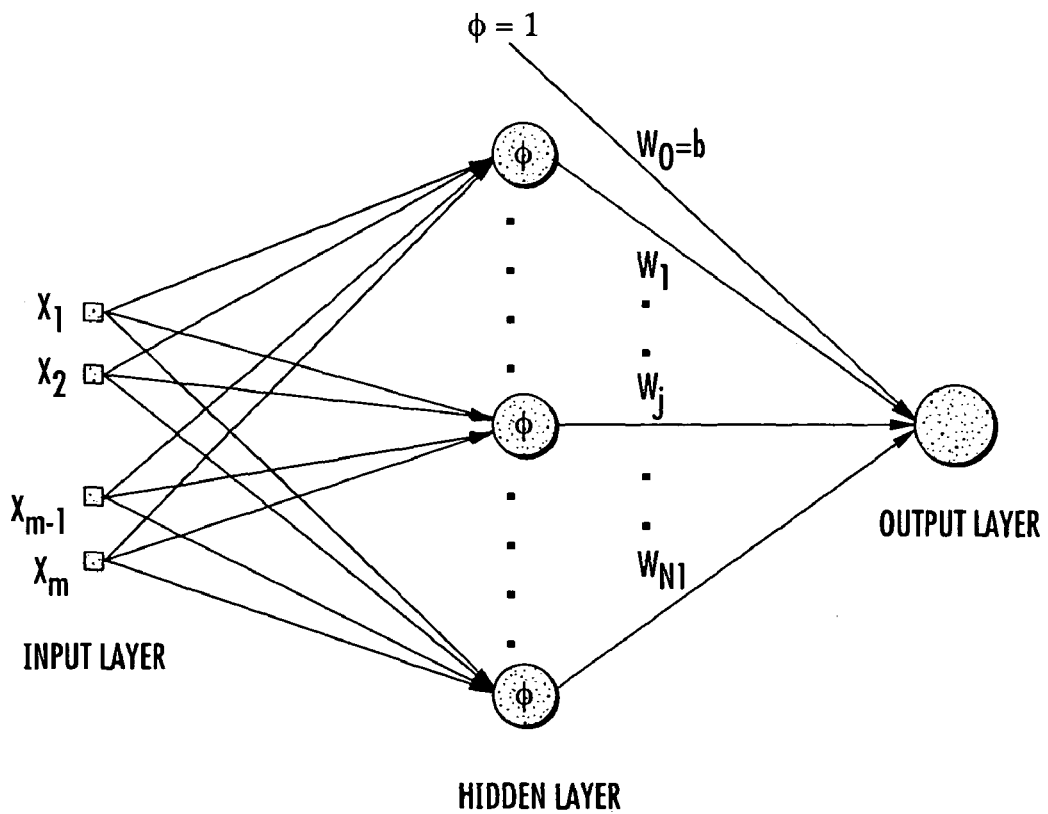
FIG. 18 depicts a typical architecture of a classic RBF neural network, as in the prior art.

For RBF (Radial Basis Function) neural networks, the map F(x) has the following form, [14] and [15]:

$$F(x) = \sum_{i=1}^{N} w_i \phi(\|x - x^{(i)}\|) \qquad (18)$$

where $\{\phi(\|x-x^{(i)}\|)|i=1, 2, \ldots, N\}$ is a set of N arbitrary nonlinear functions, known as radial basis function, the symbol $\|.\|$ denotes a norm, that is usually Euclidean, and the points $x^{(i)}$ are the centers of these functions. FIG. 18 depicts the architecture of the neural network RBF described by M. J. D. Powell equation (18).

Optimal values of the coefficients $w_i$ are determined by interpolation conditions, that is:

$$\begin{bmatrix} \phi_{11} & \phi_{12} & \ldots & \phi_{1N} \\ \phi_{21} & \phi_{22} & \ldots & \phi_{2N} \\ \vdots & \vdots & \ddots & \vdots \\ \phi_{N1} & \phi_{N2} & \ldots & \phi_{NN} \end{bmatrix} \cdot \begin{bmatrix} w_1 \\ w_2 \\ \vdots \\ w_N \end{bmatrix} = \begin{bmatrix} d_1 \\ d_2 \\ \vdots \\ d_N \end{bmatrix} \qquad (16)$$

where $\phi_{ij}=\phi(\|x^{(j)}-x^{(i)}\|)$. We may rewrite in matrix form the previous equation:

$$\phi \cdot w = d \qquad (20)$$

Assuming that interpolation matrix φ is nonsingular, we have that:

$$w = d \cdot \phi^{-1} \qquad (21)$$

In literature, there are several classes of functions for which interpolation matrix φ is always invertible:

Multiquadrics: $\phi(r)=\sqrt{r^2+c^2}$ for some c>0 and r∈R

Inverse multiquadrics:

$$\phi(r) = \frac{1}{\sqrt{r^2 + c^2}}$$

for some c>0 and r∈R

Gaussian functions:

$$\phi(r) = \exp\left(-\frac{r^2}{2\sigma^2}\right)$$

for some σ>0 and r∈R

For a more detailed description of the functions classes, as previously mentioned, the interested reader is addressed to the work [16].

There is a special class of RBF neural networks, known as RBF-PNN, where the acronym PNN means Probabilistic Neural Network. These networks are used to solve classification problems, that is they work as classifiers.

From mathematics viewpoint, a classification problem can be formalized in the following way. Given a set of points $\{X \subset R^m | x^{(i)} \in R^m \ \forall i=1, 2, \ldots, N\}$, a clustering process induces a partition of x in 1<c<N sub-structures. Membership of X points to c sub-structures, determined by clustering process, is fixed by membership matrix $U_{ik}$, where $k=1, \ldots, c$ and $i=1, \ldots, N$.

Matrix element $U_{ik}$ represents the probability that the i-th point belongs to c-th cluster. Usually, matrix elements $U_{ik}$ satisfy some normalization conditions.

These conditions and the different ways by which a clustering process can be performed distinguish several clustering algorithms known in literature.

Figure 19:
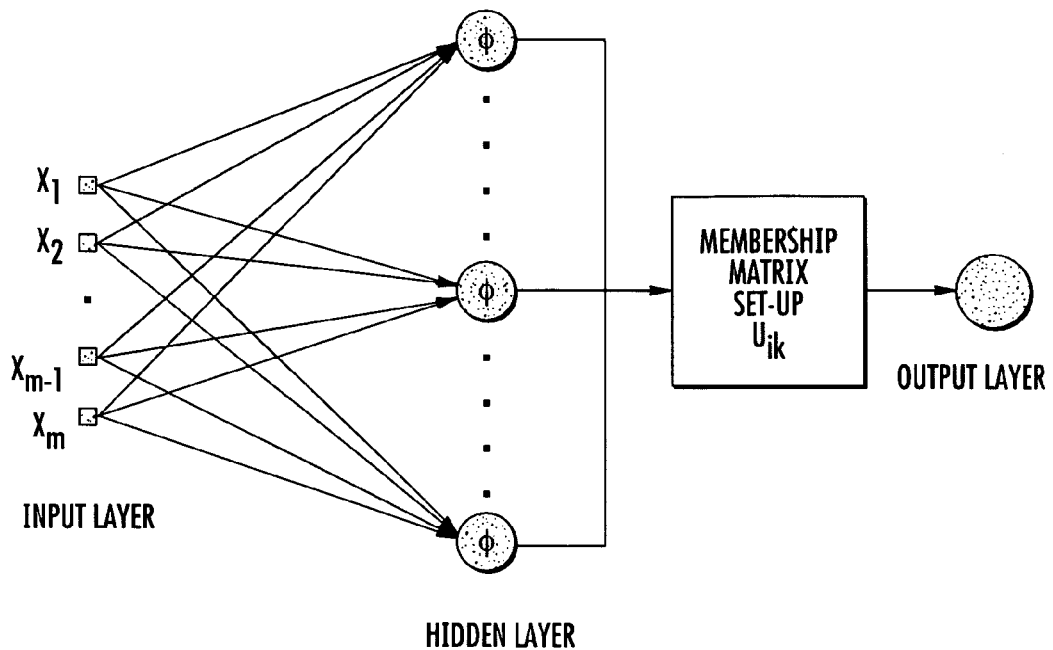
FIG. 19 depicts a typical architecture of a classic RBF-PNN neural network as in the prior art.

FIG. 19 shows the typical architecture of a RBF neural network. In this scheme, after the hidden layer there is a block which computes membership matrix elements corresponding to input vector. There are several paradigms used to build $U_{ik}$ matrix. For RBF-PNN networks, the most common is "the winner takes all neurons". In other words, we simply evaluate hidden layer neurons outputs, hence we assign to the input vector the membership class of hidden layer neurons which has the largest output. Hidden layer neurons outputs depend on the distance of the input vector from the centers of radial basis functions and on spreads of the same functions. A radial basis function is a Gaussian function having the following form:

$$\phi_k = \exp\left(-\frac{\|x^{(k)} - x^{(i)}\|^2}{S_k}\right) \quad (22)$$

$i = 1, \ldots, N$ and $k = 1, \ldots, N_1$

In eq. (22), N is the number of vectors used for testing of neural network model while $N_1$ is the number of neurons of the hidden layer; usually, the last matches the number of samples used for neural network training. In eq. (2) $S_k$, which is related to Gaussian function variance, represents the so-called "spread" factor.

Its value is in [0, 1] range and it modulates the neuronal activation function sensitive. The smaller the parameter $S_k$, the more sensitive the neuron. For a better comprehension of the concept of "neurons sensitiveness", it must kept in mind that:

$$\phi_k \geq 0.5 \; \forall x^{(*)} \in R^m \| x^{(k)} - x^{(*)} \| \leq 0.8326 \cdot \sqrt{S_k} \quad (23)$$

The points $x^{(*)}$ satisfying eq. (23) describe a hypersphere, having the center in $x^{(k)}$, whose radius increases as $S_k$ values decrease. In brief, little values of $S_k$ induce, for a fixed threshold of the membership probability (in the example of eq. (7) this threshold is equal to 0.5) of testing vectors to the class of the current hidden neuron (in this case it is the k-th), a larger hypersphere.

Known RBF-PNN neural networks have two limitations: they use the same spread factor for each neuron of hidden layer and they have not an explicit and definite procedure to determine the optimal value of $S_k$ according to the current classification problem.

The neural network model developed by the applicants, called MultiSpread-PNN, overcomes the above noted two limitations of known models.

First, the hidden layer coupling each neurons is built with different spread factors. Second, an explicit and definite procedure to determine the optimal string of $N_1$ spread factors is established. In this last phase, EA (Evolutionary Algorithms) are used.

Figure 20:
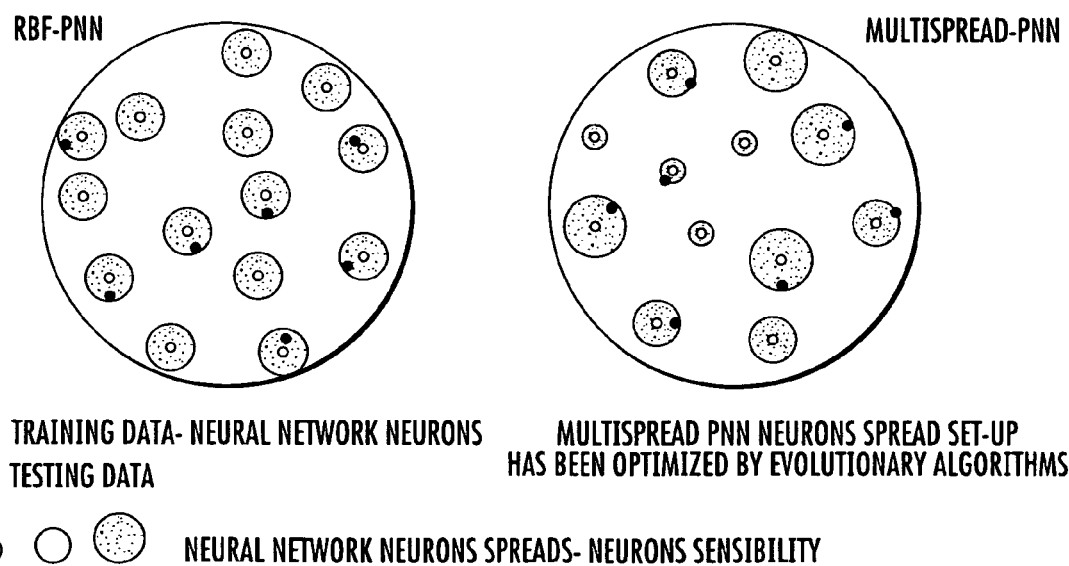
FIG. 20 compares a classic RBF-PNN neural network with a MultiSpread-PNN neural network of this invention.

FIG. 20 compares graphically a RBF-PNN and a Multi-Spread-PNN neural network of this invention. The spheres represent a three-dimensional section of hyperspheres, having unitary ray, by which the $R^m$ subspace can be described from which the model inputs are extracted. The $N_1$ spread factors of MultiSpread-PNN are endogenous parameters of the model. Research space of these parameters is $R_{[0,1]}^{N_1}$, where the symbol $R_{[0,1]}$, represents real numbers in the compact range [0, 1]. An exhaustive research in a similar space is not possible, thus for this research EA, such as ES−(λ+μ) (Evolution Strategy), PSOA (Particle Swarm Optimization Algorithm) and different variants of DE (Differential Evolution algorithm) were used.

A trivial choice of the fitness function, could be the classification error on testing data set of the MultiSpread-PNN model. In so doing, a "generalized" estimate of the endogenous parameters of model cannot be obtained. "Generalized" estimate means that the choice of the endogenous parameters of a model is made to increase model generalization capability, that is model "generalized forecast capability" [17].

The shape of the fitness function that was used is the following one:

$$V_0(S_1, S_2, \ldots, S_{N_1}) = \frac{1}{N^*} \sum_{i=1}^{N^*} \frac{1}{N} \sum_{k_i=1}^{N} [\lambda_{k_i} - F_{(S_1, S_2, \ldots, S_{N_1})}(x^{(k_i)})] \quad (24)$$

where $$N^* = \binom{N + N_1}{N} \quad (25)$$

The formula (24) derives from generalization of the "ordinary cross-validation estimate" of endogenous parameters of a neural network (chapter 5 of [18], and [19]). The parameter $N^*$ is the number of possible choices of a testing set with N samples in a data set composed by $N+N_1$ input output couples. In eq. (24), $k_i$ labels the N elements of testing data set selected with the i-th choice. MultiSpread-PNN output is described by the symbol $$F_{(S_1, S_2, \ldots, S_{N_1})}^i.$$

The optimal string of spread factors is the one which minimizes the functional $V_o(S_1, S_2, \ldots, S_{N_1})$. To search this minimum, the above mentioned evolutionary algorithms were used.

It should be remarked that notwithstanding the differences between the MultiSpread-PNN and the RBF-PNN, the time spent for setting them up (that is for determining the values of their parameters) is substantially identical.

Figure 21:
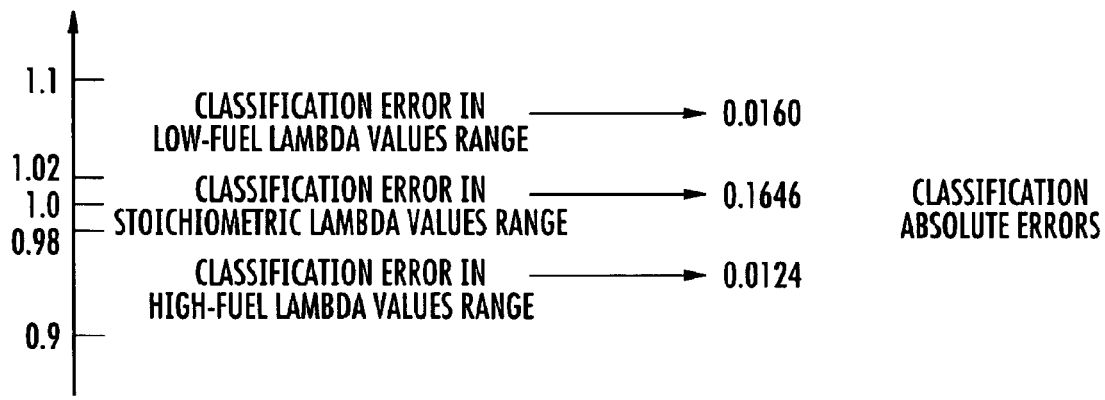
FIGS. 21 and 22 show test results obtained with a known RBF-PNN neural network and a MultiSpread-PNN neural network of this invention for sensing the air/fuel ratio of an engine.
Figure 22:
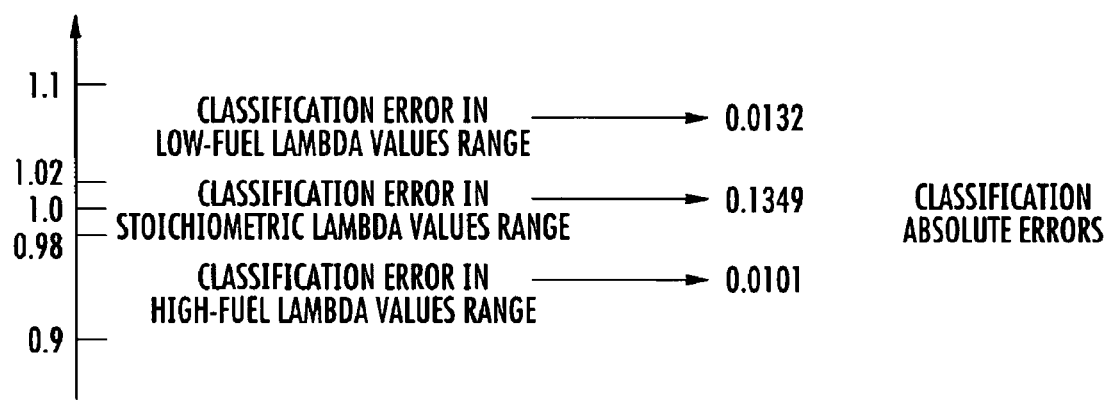

FIGS. 21 and 22 show the results obtained by the best RBF-PNN and MultiSpread-PNN, respectively. The models were trained and tested on the Yamaha engine data set. These preliminary outcomes suggest that in the sensible lambda values ranges, where a satisfactory real lambda sensor is practically infallible, virtual emulator of an on-off lambda sensor according to the model of this invention fails about just one time over 100 estimates. In other words, this means that in the sensible lambda values ranges, the neural network models that have been found have a classification rate of about 99%.

Figure 23:
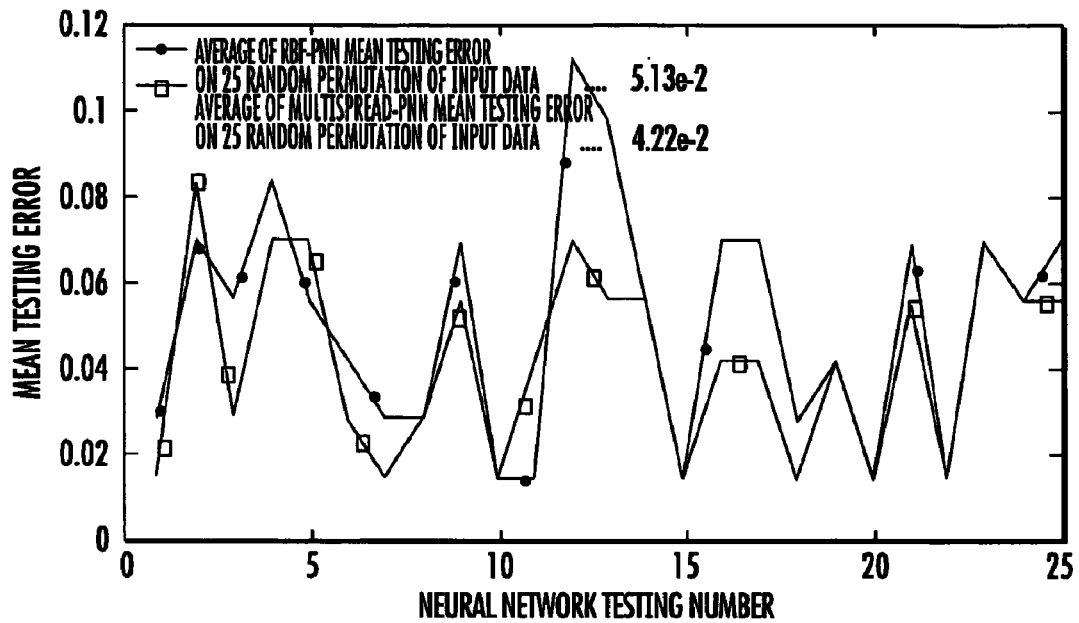
FIG. 23 compares the mean test errors of the neural networks of FIGS. 21 and 22 as a function of the number of times in which the neural networks RBF-PNN and MultiSpread-PNN have been trained, validated and tested on different training, validation and testing data sets, of this invention.

FIG. 23 shows a performance comparison between RBF-PNN and MultiSpread-PNN on 25 random permutations of the Yamaha data set. For each trial, model classification error was compared for, on the whole range of lambda values, related only to the testing data set. For the novel MultiSpread-PNN, the classification error averages to 4.22% while for the classical RBF-PNN, the classification error averages to 5.13%.

By comparing the virtual lambda sensor model of this invention with the models described in literature the following remarks can be made. The novel model of the applicants has a different working logic, it shows only one an incertitude region of relatively small width (blue rectangle in FIG. 17).

By having as inputs engine speed and inlet manifold pressure, the novel model has a forecast capability that is not limited to a single engine speed and/or a single throttle position.

The novel model is defined through a data pre-processing that establishes the optimal number of instantaneous cycles to be averaged for maximizing the correlation between Multi-Spread-PNN model inputs and outputs.

Unlike neural network models known in literature to solve classification problems, the novel MultiSpread-PNN model has on average a larger forecast capability for the same set-up computational complexity.

A neural network model as the novel MultiSpread-PNN can be simply implemented with a low cost micro-controller. The model can be downloaded on the micro-controller memory as a sequence of matrices. Computational cost for a real-time application of the MultiSpread-PNN would be equal to the time that micro-controller spends to perform simple matrices products.

The only limitation of the MultiSpread-PNN model for real-time applications is related to the number of successive pressure cycles (16) over which input parameters must be averaged for maximizing the correlation between inputs and outputs. For example, in order to set-up a fuel injection control system, it must be accounted the fact that it will take 16 cycles to obtain the model inputs and the successive strategy for updating the fuel injection law as determined by the controller. In other words, the control system has a delay equivalent to 16 pressure cycles.

Of course, this limitation can be overcome by storing in a queue the parameters values during 16 consecutive pressure cycles. The MultiSpread-PNN model inputs would be obtained by averaging the queued values; the last value is updated by a FIFO (first in first out) strategy. By this expedient an injection law control system with a delay equal to 1 pressure cycle can be realized.

Figure 24:
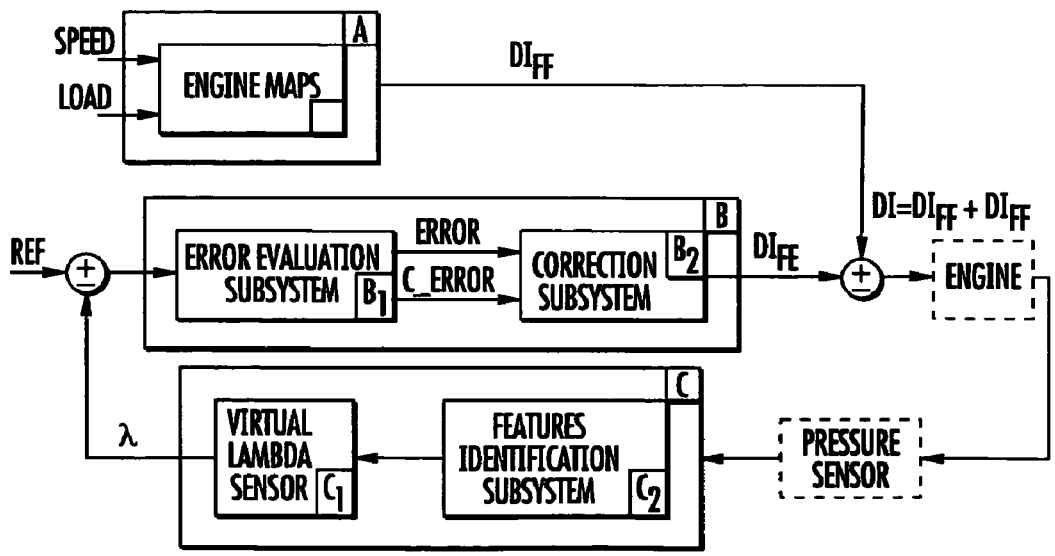
FIG. 24 shows a feedforward-and-feedback control system of this invention that uses a device of this invention for sensing the air/fuel ratio of the engine.

FIG. 24 is a block diagram scheme of a feedforward-and-feedback control system employing a virtual lambda sensor of this invention.

Basically, the system is composed of a feedforward controller A, a pressure sensor, a device of this invention C for sensing the air/fuel ratio and a feedback controller B.

The feedforward controller A is input with signals representative of the speed and of the load of the engine, and outputs a signal $DI_{FF}$, that represents a duration of the fuel injection of the engine, and a spark generation control signal SA, that determines the spark-advance of the engine. The levels of these signals $DI_{FF}$ and SA are calculated by the feedforward controller A as a function of the current speed and load of the engine using a pre-determined model of the engine.

The feedback controller B generates a feedback signal $DI_{FB}$ for correcting the calculated fuel injection duration, represented by the signal $DI_{FF}$, as a function of the difference between the signal generated by the virtual lambda sensor C of this invention and a reference value REF.

Feedforward Controller

This block generates the signals SA and $DI_{FF}$ as a function of the speed and load of the engine by using control maps of the engine. In practice, according to a common control technique, a mathematical model of the functioning of the engine is determined during a test phase in order to determine, for any pair of values of speed and load of the engine, the best values of the duration of the fuel injection and the spark-advance of the engine.

The optimal duration of the fuel injection is that corresponding to the condition $\lambda=1$. In practice, the feedforward controller A compares the input values of speed and load with those stored in a look-up table generated during a test phase of the engine, and outputs the signals $DI_{FF}$ and SA of corresponding values. When the input values of the speed and load do not correspond to any pair of the look-up table, the feedfoward controller A calculates the levels of the signals $DI_{FF}$ and SA by linear interpolation.

Notably:
the best fuel injection duration, for a pair of input values of the speed and load not contemplated in this look-up table, could differ from the value obtained by linear interpolation because an engine is a nonlinear system;
the test phase is carried out under pressure and temperature conditions, may differ sensibly from real working conditions of the engine.

Therefore, the calculated duration of fuel injection represented by the signal $DI_{FF}$ is corrected by a feedback signal $DI_{FB}$ generated as a function of the sensed air/fuel ratio of the engine.

Feedback Controller

The feedback controller B generates a feedback signal for correcting the duration of fuel injection calculated by the feedforward controller A, as a function of the difference between the signal output by the virtual lambda sensor of this invention $\lambda$ and a reference value REF.

The feedback controller B comprises an error evaluation subsystem B1 and a correction subsystem B2. The error evaluation subsystem B1 generates an error signal ERROR and an error variation signal C_ERROR, the values of which at a generic instant T are determined according to the following equations:

$$\begin{cases} \text{Error}(T) = N_1 \cdot (REF - \lambda) \\ \text{C\_error}(T) = N_2 \cdot (\text{Error}(T) - \text{Error}(T - \Delta T_1)) \end{cases}$$

wherein $N_1$ and $N_2$ are normalization constants and $\Delta T_1$ is a time delay.

Figure 25:
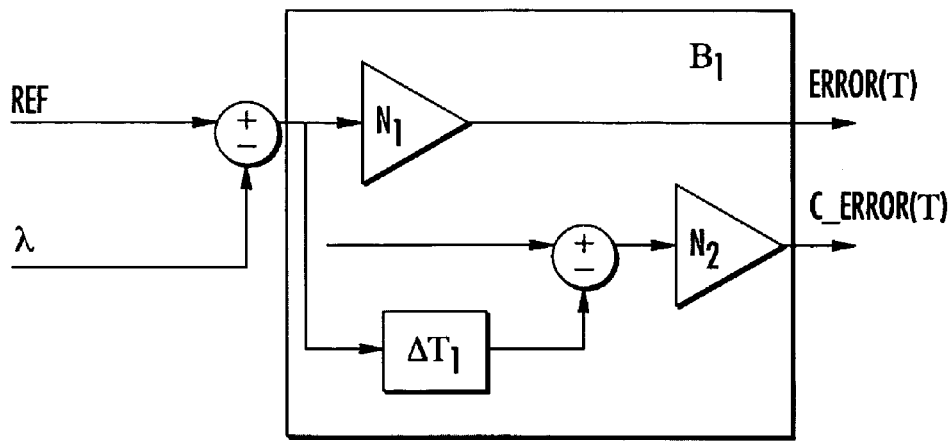
FIG. 25 shows a sample embodiment of the error evaluation subsystem B1 of FIG. 24.

A sample embodiment of the error evaluation subsystem B1 is shown in FIG. 25.

Figure 26:
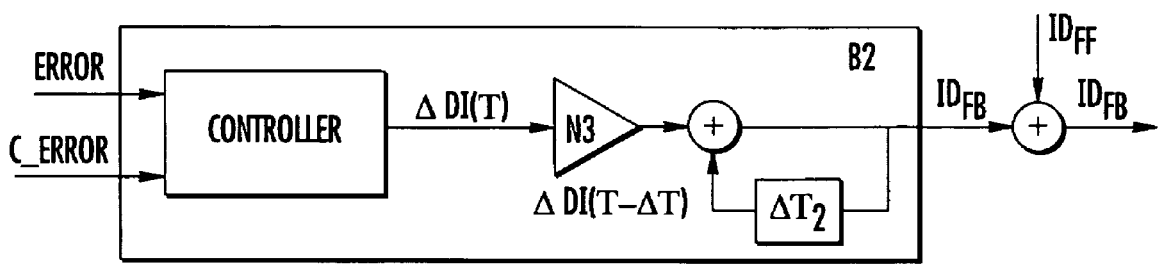
FIG. 26 shows a sample embodiment of the correction subsystem B2 of FIG. 24.

The correction subsystem B2 is preferably composed of a correction unit CONTROLLER and an output stage, as shown in FIG. 26.

The correction unit CONTROLLER is input with the signals ERROR and C_ERROR and generates, as a function thereof, a correction signal $\Delta\_DI$ of the feedback signal $DI_{FB}$ in order to nullify its input signals ERROR and C_ERROR.

Preferably, the correction unit CONTROLLER is a fuzzy logic unit with two antecedents, that are the normalized values EN and CEN of the signals ERROR and C_ERROR, respectively, and one consequent, that is the normalized value OUTPUT1 of the correction signal $\Delta\_DI$, and preferably it is defined by three membership functions for each antecedent and consequent.

Figure 27:
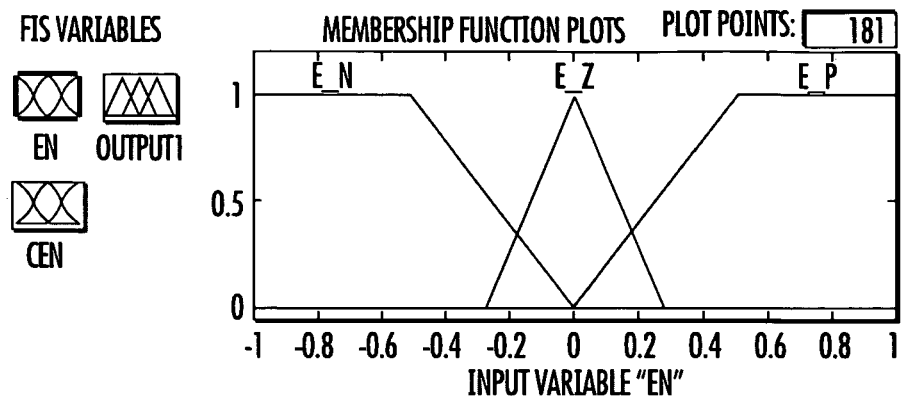
FIGS. 27 to 29 show sample membership functions for the inputs and output of the correction unit CONTROLLER of FIG. 26.
Figure 28:
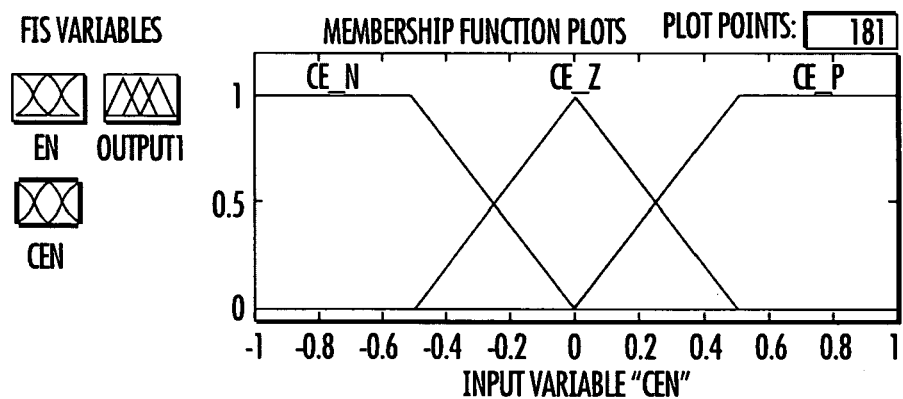
Figure 29:
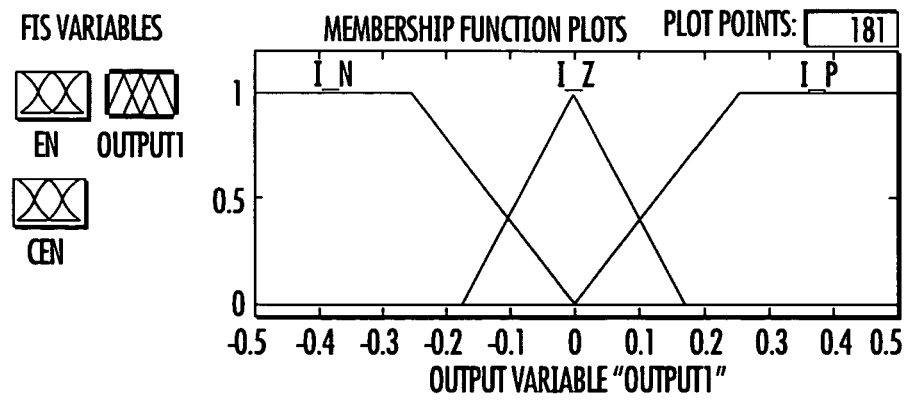

FIG. 27 shows sample membership functions E_N, E_Z and E_P when the antecedent EN is negative, null (in a fuzzy sense) or is positive, respectively. Similarly, FIGS. 28 and 29 show sample membership functions for the antecedent CEN and the consequent OUTPUT1, respectively.

Figure 30:
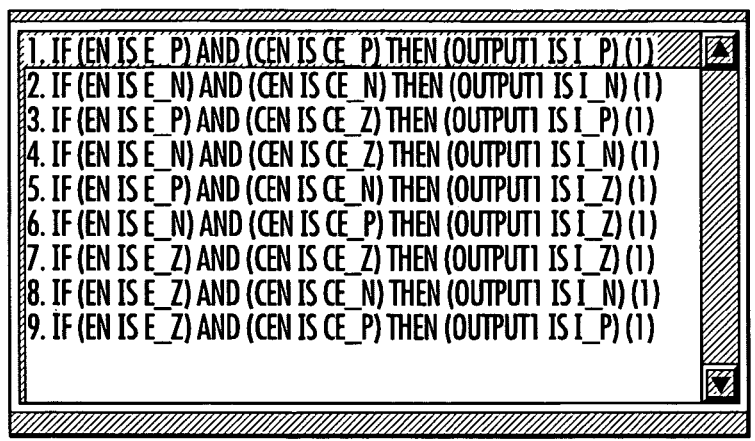
FIG. 30 shows the nine fuzzy rules of the correction unit CONTROLLER of FIG. 26.
Figure 31:
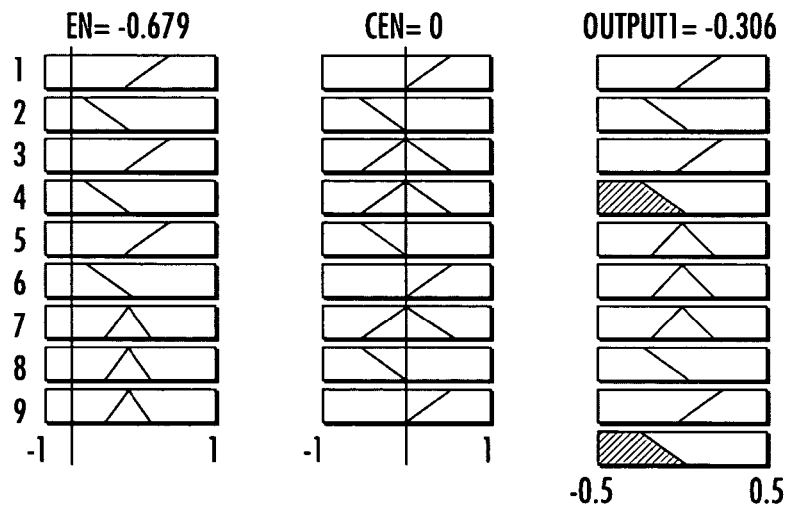
FIGS. 31 and 32 are graphs that describe the fuzzy rules of the correction unit CONTROLLER of FIG. 26.
Figure 32:
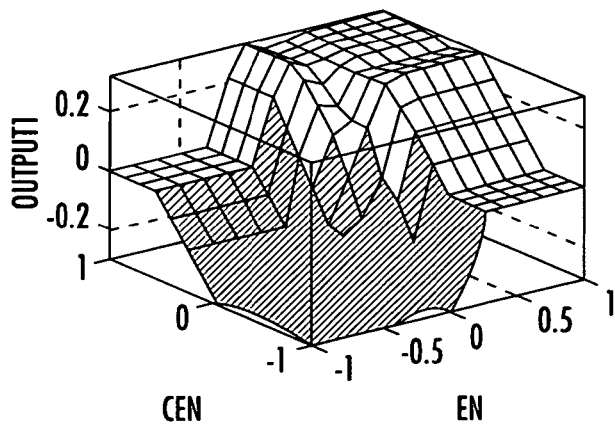

The fuzzy correction unit CONTROLLER generates the correction signal Δ_DI according to the nine fuzzy rules shown in FIG. 30. These fuzzy rules are graphically illustrated in FIG. 31 and in the tree-dimensional graph of FIG. 32.

The output stage of the correction subsystem B2 is preferably composed of an amplifier $N_3$ of the correction signal Δ_DI, and of a positive feedback loop that generates the feedback signal $DI_{FB}$ by adding to the amplified correction signal Δ_DI a delayed replica thereof Δ_DI(T−Δ$T_2$) of a certain time delay Δ$T_2$:

$$ID_{FB}=N_3 \cdot \Delta\_DI(T)+\Delta\_DI(T-\Delta T)$$

Learning Machine

The learning machine C includes an identification subsystem C2 that chooses the smallest number of characteristic parameters of the detected pressure signal sufficient for estimating the value of the air/fuel ratio. The subsystem C2 is input with the pressure signal generated by the pressure sensor in contact with at least a cylinder of the engine and implements a clustering algorithm for choosing moving averages of these characteristic parameters.

It is important that the number of characteristic parameters to be considered be as small as possible for reducing memory requirements and the number of calculations to be performed for estimating the air/fuel ratio. By contrast, a too small number of parameters may degrade accuracy.

In practice, the identification subsystem C2 generates data sets composed of values of moving averages of characteristic parameters of a certain initial set of parameters, that are potentially useful for evaluating the air/fuel ratio, each for a respective number of pressure cycles. As a function of the desired number of clusters, it groups in clusters the moving averages of each data set with a respective execution of a clustering algorithm. Then, the number of pressure cycles on which these moving averages are calculated is chosen as the number corresponding to the execution of the clustering algorithm for which the ratio between the clustering performance index and the ideal clustering performance index is maximum.

For these operations any clustering method available in literature may be used.

Figure 33:
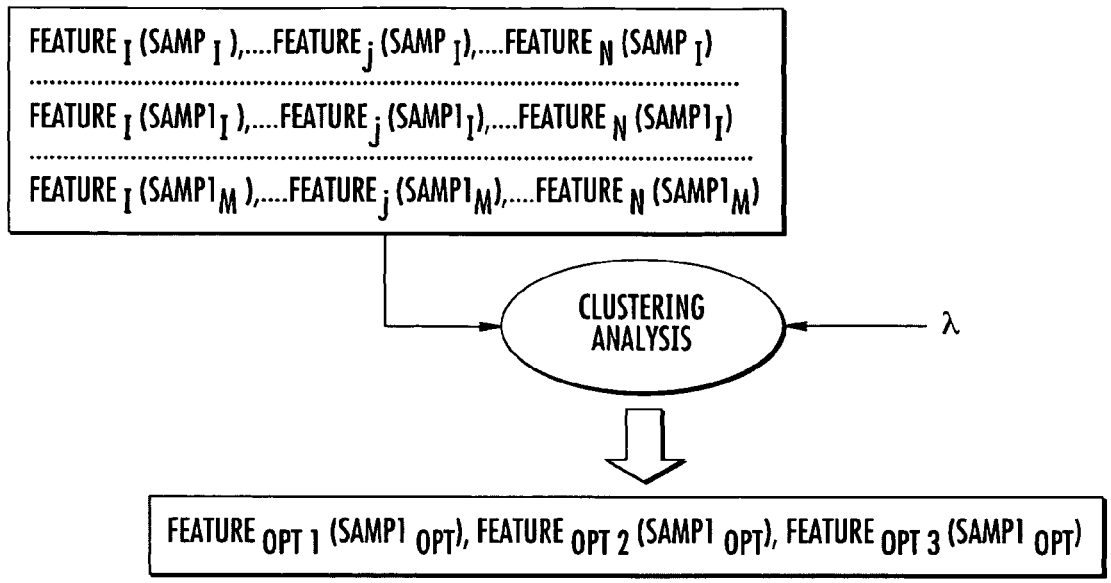
FIG. 33 illustrates schematically how the parameters for training the learning machine of the device of this invention are chosen.

It may be remarked that the clustering method thus allows to choose the best number of pressure cycles for averaging these characteristic parameters in order to evaluate the lambda factor, as schematically illustrated in FIG. 33.

The core C1 of the lambda sensor of this invention is input with the parameters chosen by the identification subsystem C2. The selected characteristic parameters of the pressure signal are the pressure Pratio40 in a cylinder for a 40° rotation of the crank, the pressure Pratio50 in a cylinder for a 50° rotation of the crank, and the pressure peak Pmax independently from the position of the crank at which it is attained.

Indeed, the core of the lambda sensor may either be a neural network, a stochastic machine, a support vector machine, a committee machine or a hybrid learning machine.

Figure 34:
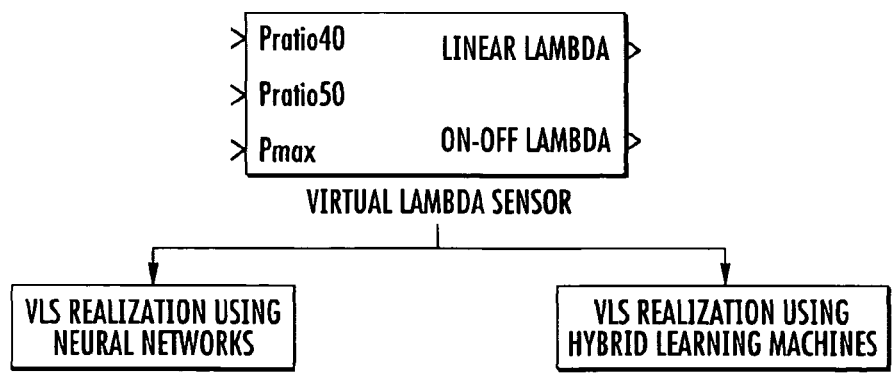
FIG. 34 illustrates schematically embodiments of the device of this invention for sensing the air/fuel ratio.

However, as schematically illustrated in FIG. 34, the most performing cores are composed of a neural network or a hybrid learning machine.

Virtual Lambda Sensor Core Based on a Neural Network

Figure 35:
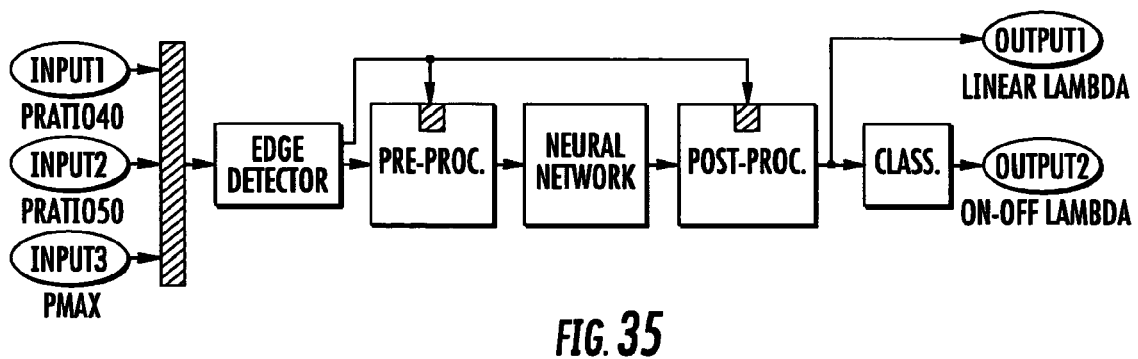
FIG. 35 shows an embodiment of the device of this invention based on a neural network.

FIG. 35 shows a block scheme of a lambda sensor core based on a neural network.

As already remarked, the preferred inputs of the core are the parameters Pratio40, Pratio50 and Pmax, that are the characteristic parameters of the pressure signal that more often have been chosen by the identification subsystem C2 during the extensive tests that were carried out.

Signals representative of these parameters are processed by an input stage EDGE DETECTOR, for sampling the input signals and generating a synchronization pulse for the subsequent blocks in cascade.

According to a preferred embodiment of this invention, the instant at which the synchronization pulse is generated is determined as a function of the instant at which a pressure peak is detected. Indeed, it has been experimentally verified that this instant is sufficiently stable and relatively free of spurious variations.

The block PRE-PROC is a pre-processor that generates a moving average of the data output by the input stage EDGE DETECTOR, for filtering these data from noise.

The number of samples to be considered for calculating the moving average, which is a number of pressure cycles of the engine, must be established. This number should not be too large, because this would make the virtual lambda sensor less prompt in reacting to functioning variations of the engine, nor too small, otherwise the level of noise corrupting the moving average would be too high.

The block POST-PROC is a post-processor analogous to the pre-processor PRE-PROC.

Figure 36A:
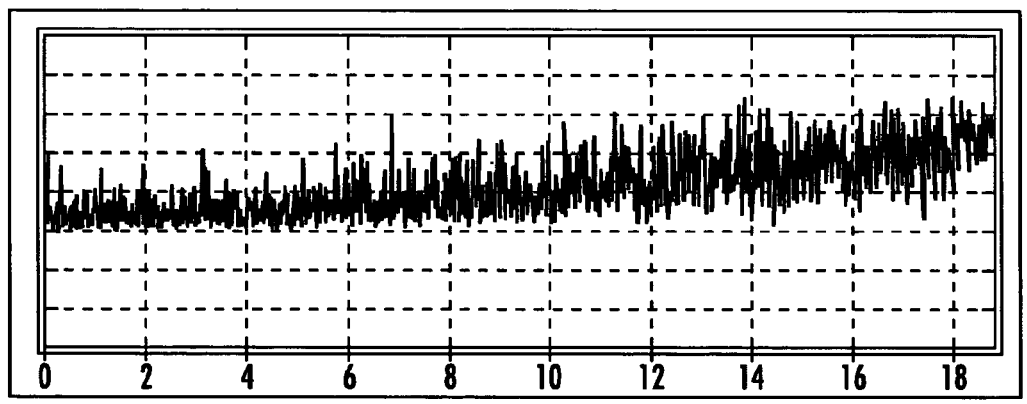
FIGS. 36a and 36b compare sample graphs of the output generated by the device of FIG. 35 without and with the pre-processor and the post-processor, respectively, of this invention.
Figure 36B:
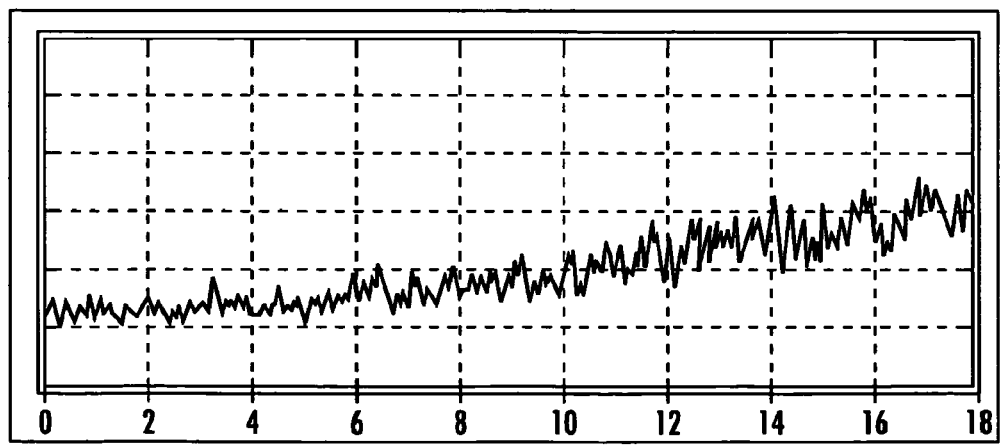

The pre-processor and the post-processor effectively reduce the noise corrupting the output signal of the virtual lambda sensor core, as may be easily inferred by comparing the graphs in FIGS. 36a and 36b of the output signal with and without the blocks PRE-PROC and POST-PROC, respectively.

The learning part NEURAL NETWORK of the virtual lambda sensor core is a neural network, preferably a MLP (Multi Layer Perceptron) with three inputs, thirty neurons in the hidden layer and a single output. The number of neurons has been chosen by a so-called "ordinary cross-validation" procedure with single-objective and multi-objectives optimization.

The neural network may be trained with classic learning algorithms, such as the "resilient back propagation" algorithm and/or the Levenberg-Marquardt algorithm, and stochastic search algorithm, such as the Particle Swarm Optimization Algorithm (PSOA).

Virtual Lambda Sensor Core Based on a Hybrid Learning Machine

Figure 37:
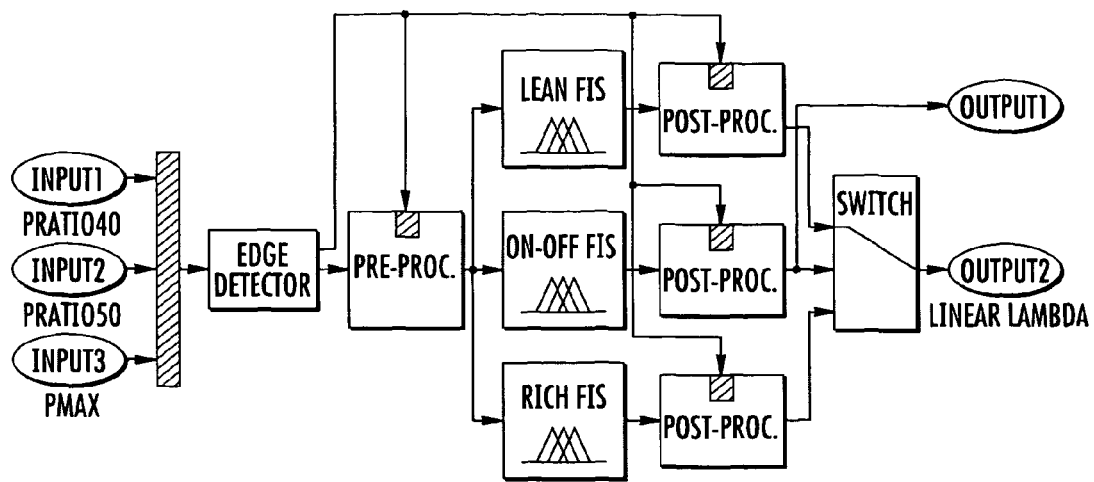
FIG. 37 shows an embodiment of the device of this invention based on three fuzzy subsystems.

An embodiment of the core of the virtual lambda sensor that includes a so-called "committee machine" is shown in FIG. 37. It includes an input stage EDGE DETECTOR, a pre-processor PRE-PROC and three post-processors POST-PROC that are identical to the homologous blocks of FIG. 35.

Differently from the embodiment of FIG. 35, the embodiment of FIG. 37 comprises three fuzzy subsystems LEAN FIS, ON-OFF FIS and RICH FIS, that are typically "TSK Singleton" fuzzy inference subsystems, that are defined by different parameters and generate respective signals related to the air/fuel ratio of the engine for $\lambda<1$, $\lambda>1$ and $\lambda\approx1$, respectively.

In practice, the fuzzy subsystem ON-OFF FIS works like an on/off lambda sensor. An output multiplexer SWITCH generate an output signal OUTPUT2 that is the signal generated by the subsystem LEAN FIS or RICH FIS depending on the value of the output of the ON-OFF FIS subsystem. Even this last signal is made available (OUTPUT1), thus the virtual lambda sensor core of FIG. 37 may function either as a linear lambda sensor (OUTPUT2) or as an on/off lambda sensor (OUTPUT1).

Each fuzzy subsystem has three antecedents and one consequent and preferably is defined by three membership functions for each antecedent or consequent.

The fuzzy subsystems are trained using experimental data with a "supervised training" procedure implementing a stochastic search algorithm (such as a PSOA) for calculating optimal values to be assigned to the parameters of the membership functions, the crisp values and the like.

The fuzzy subsystem RICH FIS is trained such that the output signal preferably ranges between 0.85 and 0.98, while the fuzzy subsystem LEAN FIS outputs a signal that ranges between 1.02 and 1.15. The fuzzy subsystem ON-OFF FIS is trained for estimating very accurately the air/fuel ratio for $0.98<\lambda<1.02$. An eventual error in this range would make the output multiplexer SWITCH select the output of the subsystem LEAN FIS when the air/fuel mixture is reach or vice versa.

Anyway, such an error does not worsen significantly the accuracy of the device of this invention because the subsystems LEAN FIS and RICH FIS have almost the same accuracy in the range $0.98<\lambda<1.02$. Obviously, it is important that the subsystem ON-OFF FIS do not make an error larger than 0.2 in determining $\lambda$, otherwise the accuracy could be negatively affected.

The pre-processor and the post-processors filter the noise that may corrupt signals input to and output from the fuzzy subsystems. They are useful because spurious spikes corrupting the signal output by the subsystems could degrade relevantly the accuracy of the sensing of the air/fuel ratio. In particular, spurious spikes output by the ON-OFF FIS subsystem must be filtered because they could induce spurious switching of the multiplexer.

Compared with classic lambda sensors the virtual device of this invention for sensing the air/fuel ratio has numerous advantages. The device of this invention need not warming up for functioning correctly, has a relatively low cost and tracks the air/fuel ratio very quickly.

By contrast, certain lambda sensors (such as the lambda sensor HEGO) must attain a temperature of about 300° C. before starting to function accurately, they are relatively expensive and subjected to wear. Moreover their accuracy is limited by the fact that they are installed in the exhaust gas pipe of the engine, which means that they cannot generate a signal representing the air/fuel ratio before the exhaust gases reach the sensor. Therefore, classic lambda sensors are generally sluggish in responding to rapid changes of the functioning conditions of the engine.

Formula 1 cars often damage their exhaust gases pipes where the lambda sensors are installed. In these situations, a classic lambda sensor may not sense correctly the air/fuel ratio and the engine risks to be miscontrolled.

The feedforward-and-feedback control system of this invention has been real-time tested on the Yamaha engine YP125.

In order to determine the relationship between air/fuel ratio (lambda value) and parameters from the cylinder pressure cycle, STMicroelectronics and Yamaha agreed on the following conditions for the experimental tests:

1. 4600 rpm, torque=1.5 Nm
2. 5600 rpm, torque=4.4 Nm
3. 4600 rpm, WOT (Wide Open Throttle) condition Yamaha constraints on these engine conditions were respectively to control the maintain engine close the stoichiometric condition with a maximum 1% error and to have a response time of the control system equal or of less than 100 milliseconds from the moment the engine reaches the desired steady state.

The tests have been conducted maintaining, for each condition, fixed spark advance, throttle position, injection timing and modifying only the duration of the fuel injection.

The goal of realizing an efficient injection control system for the Yamaha YP125 mono-cylinder gasoline engine meant to maintain the YP125 engine close to stoichiometric combustion in all the above mentioned three conditions of operation.

A closed lop injection control system based on soft computing models was realized. The loop included a Virtual Lambda Sensor and control system of this invention.

Figure 38:
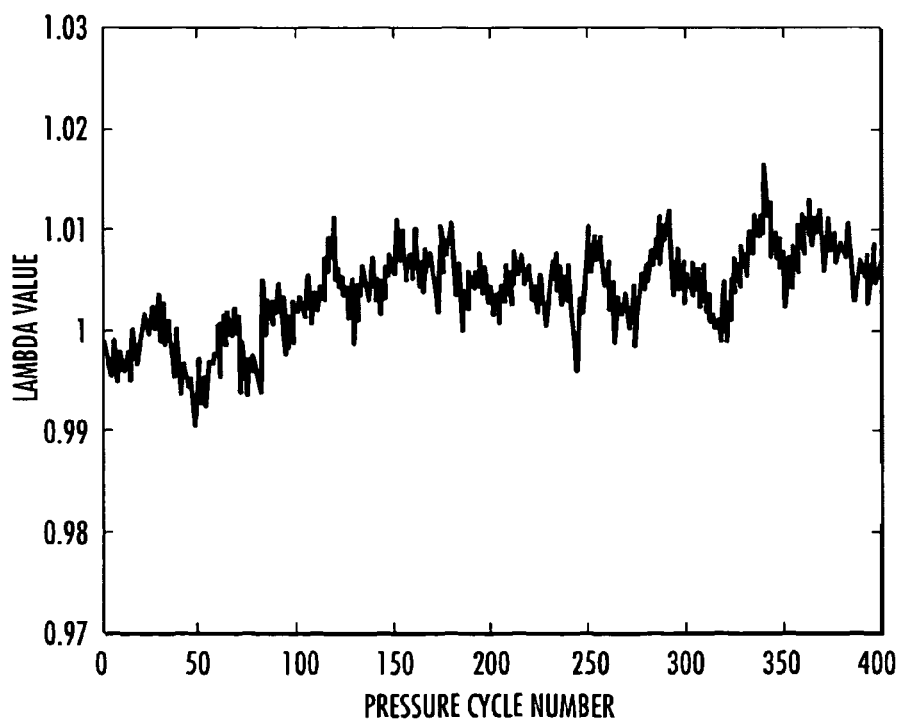
FIG. 38 is a graph of sensed values of the air/fuel ratio during a test in which an engine in steady state at 4600 rpm and WOT condition was controlled by the feedforward-and-feedback control system of this invention.

FIG. 38 describes the time-changing trend of the lambda values as sensed by a real lambda sensor when the control system of this invention was activated, in order to test its performances. The engine is effectively maintained close to the stoichiometric condition with an error smaller than 1%.

Figure 39:
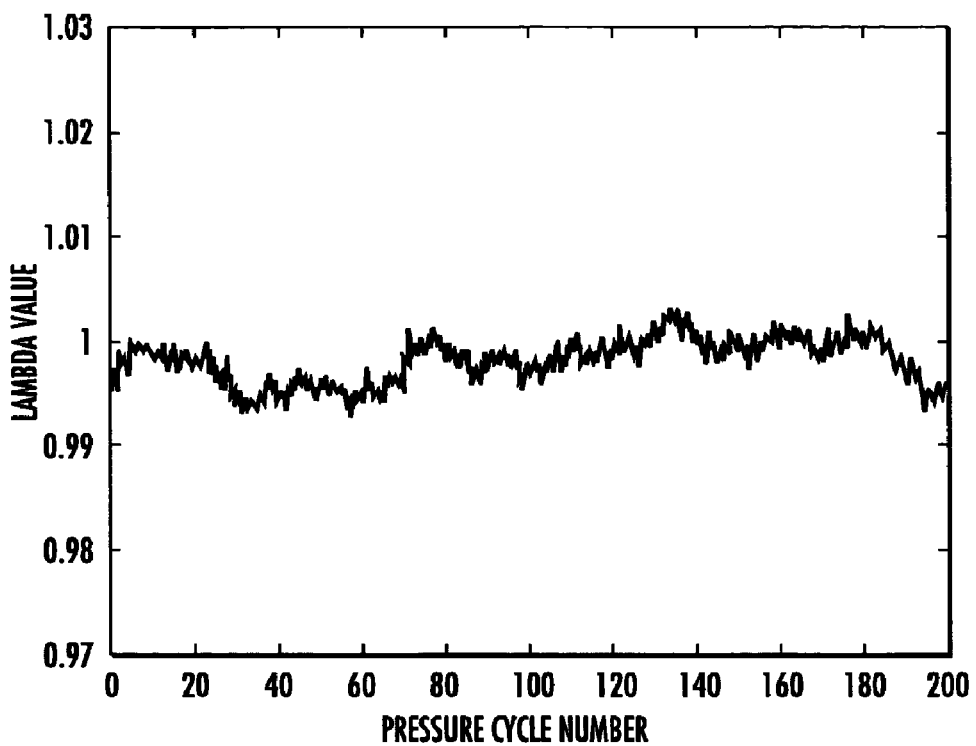
FIG. 39 is a graph of sensed values of the air/fuel ratio during a test in which an engine in steady state at less than 4600 rpm and throttle not in WOT condition was controlled by the feedforward-and-feedback control system of this invention.
Figure 40:
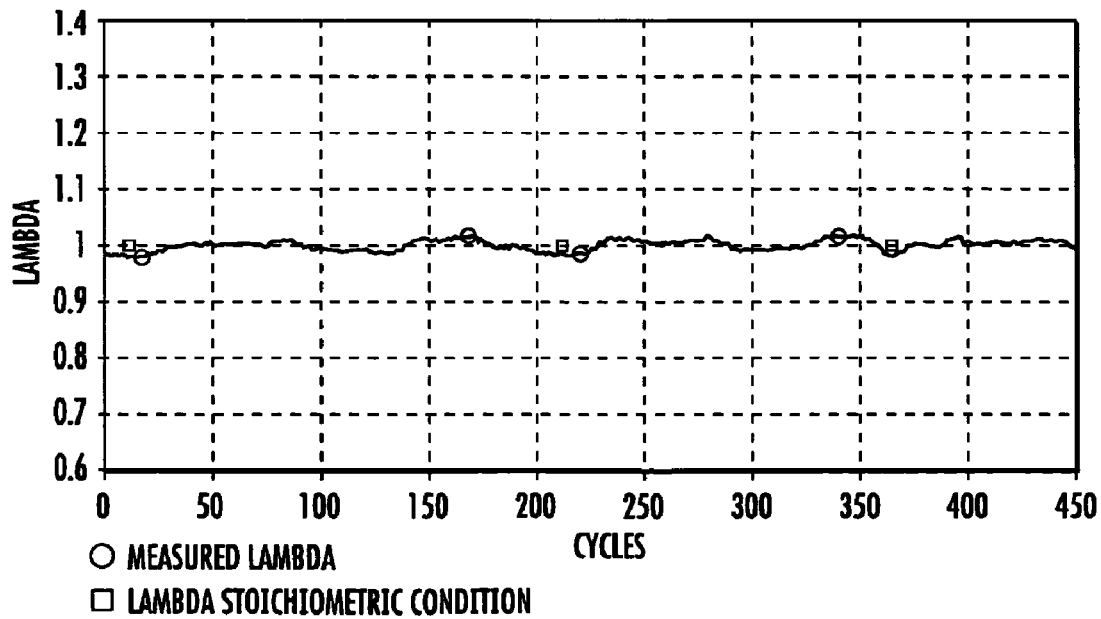
FIG. 40 is a graph of sensed values of the air/fuel ratio during a test in which an engine in steady state at 4600 rpm and torque of 1.5 Nm was controlled by the feedforward-and-feedback control system of this invention.

During the tests, the engine working conditions were changed with satisfactory results even at lower engine speeds than 4600 rpm (down to 3600 rpm) and even for different throttle positions (down to 33% opening). These results are reported in FIGS. 39 and 40.

Finally, the control system of this invention was tested under different transient conditions. After few seconds, the control system brought back the engine to stoichiometric combustion conditions within 1% error.

Figure 41:
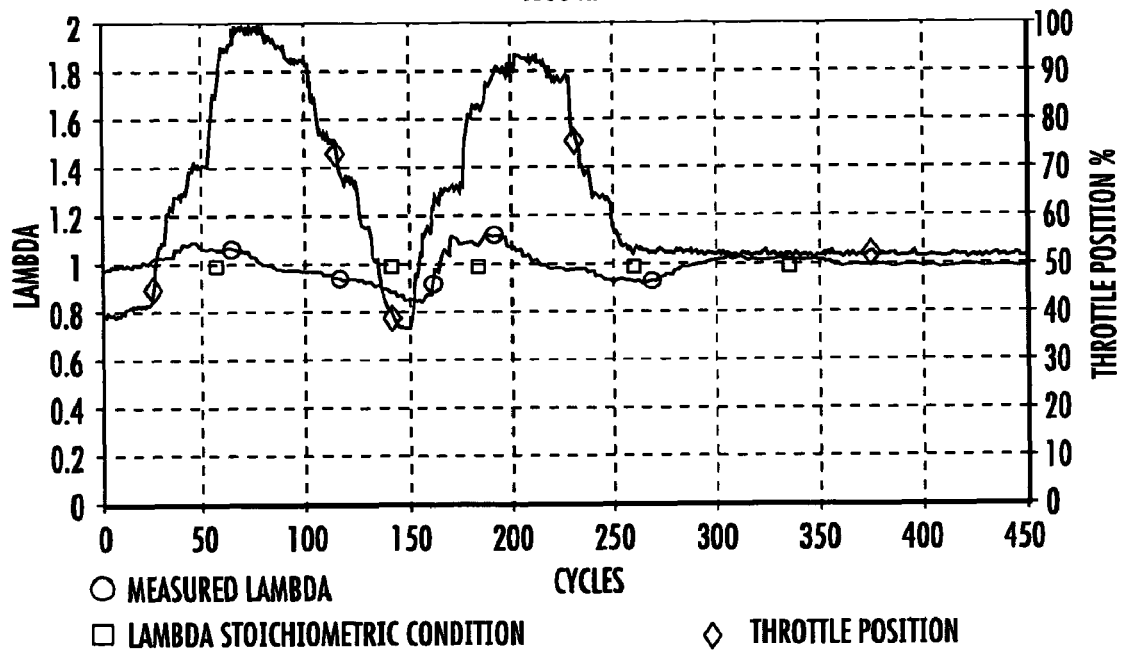
FIG. 41 is a graph of sensed values of the air/fuel ratio during tests in which an engine in transient conditions after variations of the throttle position from 38% to 100% was controlled by the feedforward-and-feedback control system of this invention.
Figure 42:
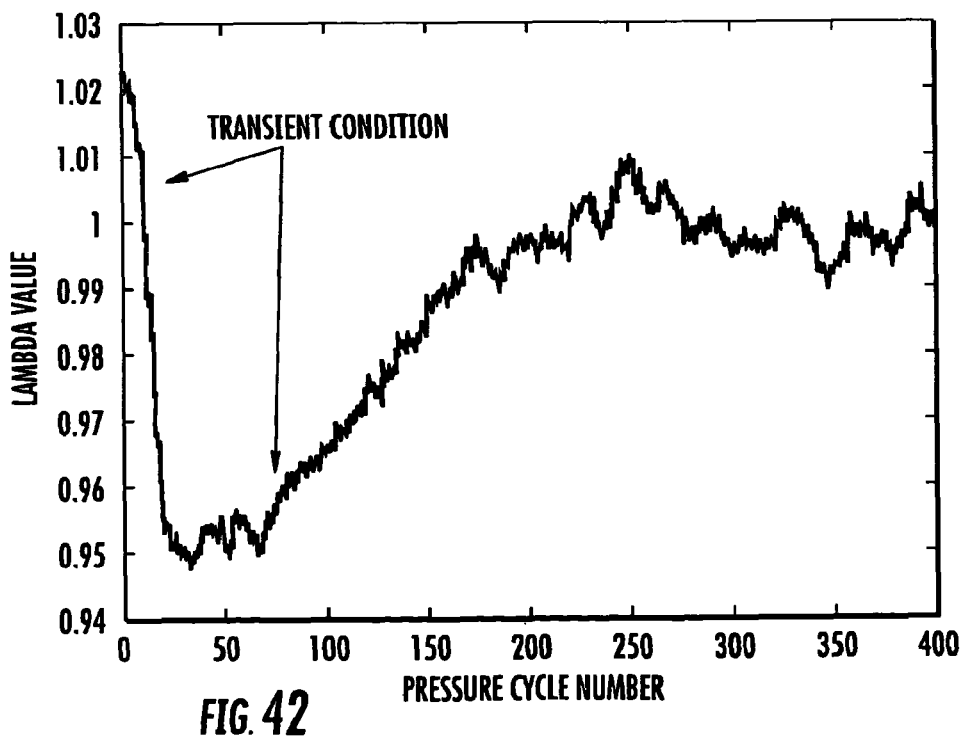
FIG. 42 is a graph of sensed values of the air/fuel ratio during a test in which an engine in transient conditions at 4600 rpm and WOT condition was controlled by the feedforward-and-feedback control system of this invention.
Figure 43:
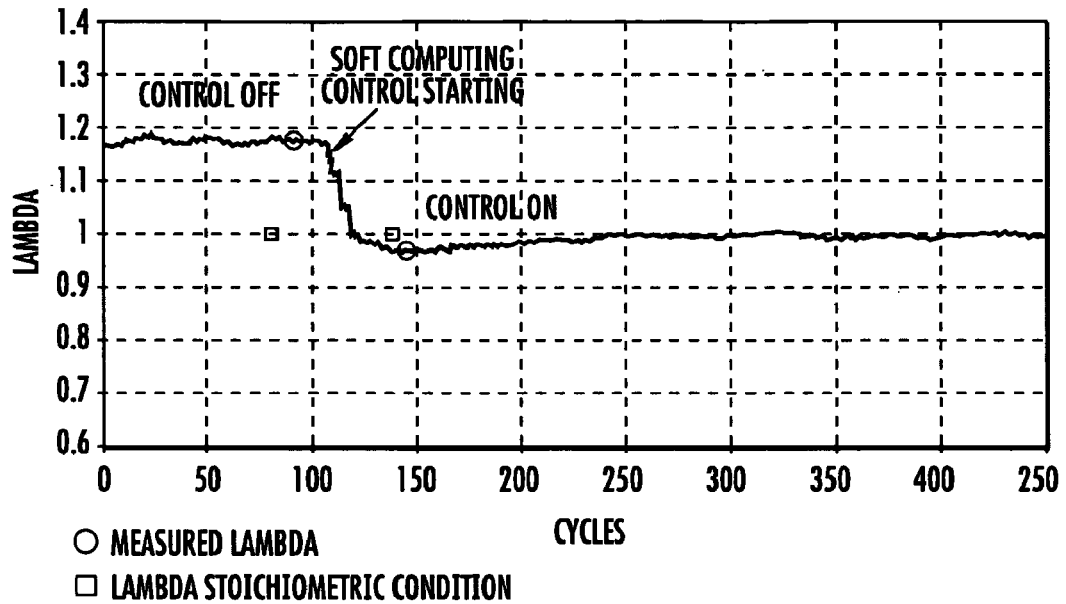
FIG. 43 is a graph of sensed values of the air/fuel ratio during a test in which an engine initially functioning with lean mixtures was controlled by the feedforward-and-feedback control system of this invention.

FIGS. 41, 42 and 43 illustrate the results of these tests under transient conditions.

Figure 44:
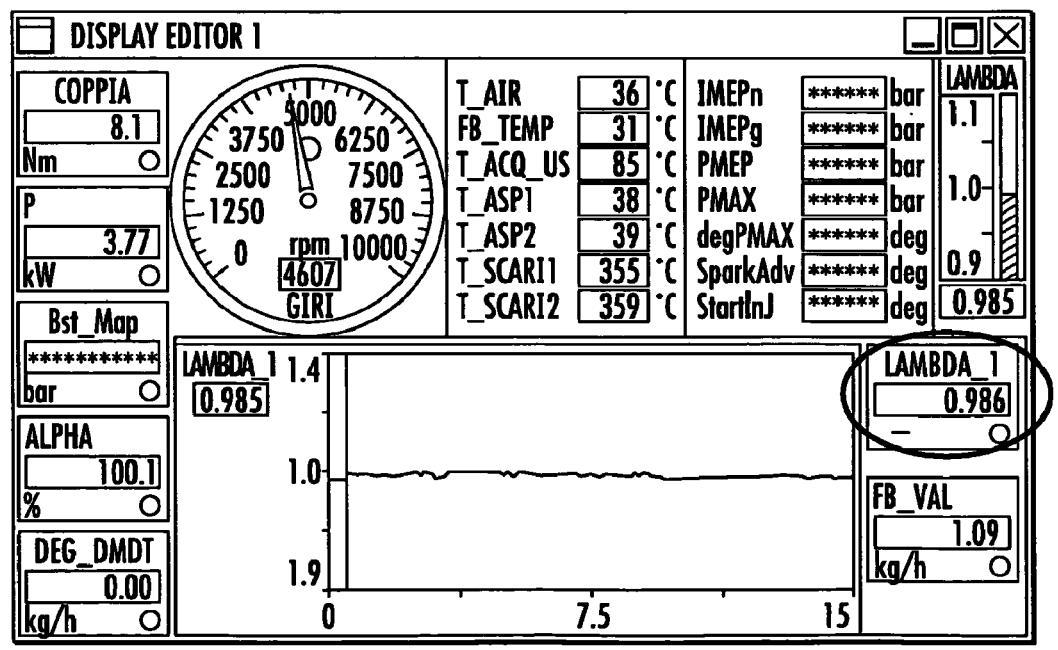
FIG. 44 displays the software console of the used test system during a test in which an engine in a steady state at 4600 rpm and WOT condition was controlled by the feedforward-and-feedback control system of this invention.

FIG. 44 depicts the test console for simulating the functioning of the engine controlled by the system of this invention at 4600 rpm and WOT condition.

Figure 45:
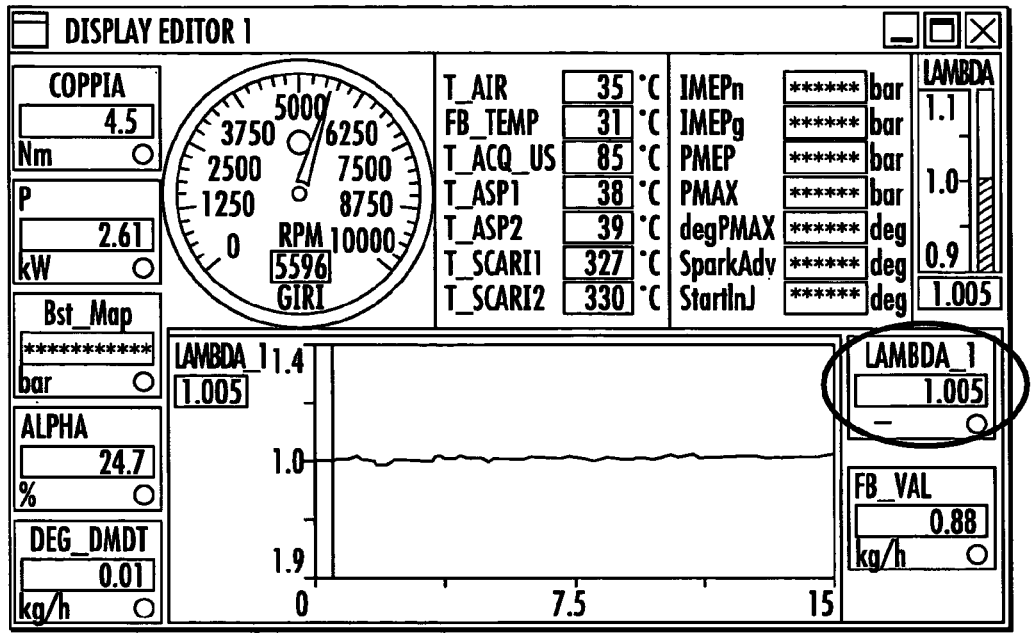
FIGS. 45 and 46 display the software console of the used test system during a test in which an engine in transient conditions at 5596 rpm and 4605 rpm, respectively, was controlled by the feedforward-and-feedback control system of this invention.
Figure 46:
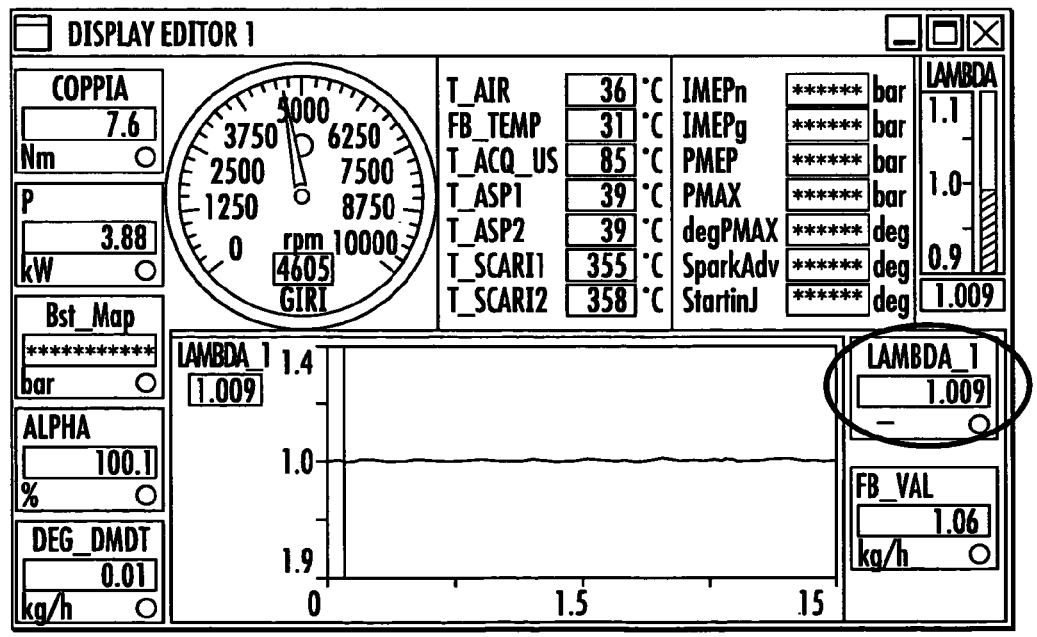

FIGS. 45 and 46 depict the test console when the feedforward-and-feedback control system of the engine had restored stoichiometric conditions ($\lambda \approx 1$) starting from a condition in which the engine in working with a rich mixture ($\lambda<1$) and with a lean mixture ($\lambda>1$), respectively.

The meaning of the labels in FIGS. 44 to 46 is resumed in the following table:

| | |
|---|---|
| Coppia (Nm) | Torque |
| P (kW) | Power |
| Bst_Map (bar) | Intake manifold pressure |
| ALPHA (%) | Throttle position |
| DEG_DGMT (kg/h) | Intake manifold air flow |
| T_AIR (° C.) | Air temperature |
| FB_TEMP (° C.) | Fuel balance temperature |
| T_ACQ_US (°C) | Cooling system water temperature |
| T_ASP1 (° C.) | Intake manifold temperature |
| T_ASP2 (° C.) | Intake manifold temperature |
| T_SCARI1 (° C.) | Exhaust gases temperature |
| T_SCARI2 (° C.) | Exhaust gases temperature |
| LAMBDA_1 | Lambda value |
| FB_VAL (kg/h) | Fuel balance value |

REFERENCES

[1] T. W. Long, C. M. Atkinson and E. L. Hanzevack. Virtual sensing: a neural-network-based intelligent performance and emissions prediction system for on-board diagnostics and engine control. In Proceedings of the 1998 SAE International Congress & Exposition, vol. 1357, 208, pages 39{51, 1998.

[2] P. A. Howson, R. J. Howlett, S. D. Walters and I. Park. Air-fuel ratio measurement in an internal combustion engine using a neural network. In International Conference on Advances in Vehicle Control and Safety, AVCS'98, Amiens, France, July 1998.

[3] S. D. Walters, R. J. Howlett, M. M. de Zoysa and P. A. Howson. Neural network techniques for monitoring and control of internal combustion engines. In International ICSC Symposium on Intelligent Industrial Automation, Genoa, Italy, June 1999.

[4] A. M. Wahl, K. Ratton, E. N. Balles, E. A. VanDyne and M. C. Lai. In cylinder air/fuel ratio approximation using spark gap ionization sensing. In Proceedings of the 1998 SAE International Congress & Exposition, vol. 1356, pages 39-44, 1998.

[5] F. Tanabe, Y. Ohashi, W. Fukui and A. Ueda. The application of ionic current detection system for the combustion limit control. In Proceedings of the 1998 SAE International Congress & Exposition, vol. 1356, pages 79-85, 1998.

[6] T. Rognvaldsson, N. Wickstrom, C. Carlsson, M. Larsson, M. Hellring, T. Munther and J. Nytomt. Spark advance control using the ion current and neural soft sensor. SAE Paper, 99P-78.

[7] T. Rognvaldsson, N. Wickstrom, C. Carlsson, M. Larsson, M. Hellring, T. Munther and J. Nytomt. Robust afr estimation using the ion current and the neural networks. SAE Paper, 99P-76.

[8] R. J. Howlett and S. D. Walters. A multi-computer neural network architecture. IEEE Electronics Letters, 35.

[9] M. M. de Zoysa, R. J. Howlett and S. D. Walters. Monitoring internal combustion engines by neural network based on virtual sensing. In Recent Advances in Artificial Neural Networks Design and Applications, pages 291-318. Jain L. and Fanelli A. M., CRC Press, 2000.

[10] R. J. Howlett, M. M. de Zoysa, S. D. Walters and P. A. Howson, Neural Network Techniques for Monitoring and Control of Internal Combustion Engines, International Symposium on Intelligent Industrial Automation 1999.

[11] A. N. Tikhonov. On solving incorrectly posed problems and method of regularization. *Doklady Akademii Nauk USSR*, 151.

[12] A. N. Tikhonov. On regularization of ill-posed problems. *Doklady Akademii Nauk USSR*, 153.

[13] A. N. Tikhonov and V. Y. Arsenin. Solution of Ill-posed Problems. W. H. Winston.

[14] M. J. D. Powell. Radial basis function for multivariate interpolation: A review. *IMA Conference on Algorithms for the Approximations of Functions and Data*.

[15] M. J. D. Powell. The theory of radial basis function approximation in 1990. *Advances in Numerical Analysis Vol. II: Wavelets, Subdivision Algorithms, and Radial Basis Functions*.

[16] M. J. D. Powell. Radial basis function approximations to polynomials. In *Numerical Analysis* 1987 *Proceedings, Dundee, UK*, pages 223-241, 1988.

[17] V. N. Vapnik. An overview of statistical learning theory. *IEEE Trans. On Neural Networks*, 9, 1999.

[18] S. Haykin. *Neural Networks: A comprehensive Foundation*. Prentice Hall International Editions, Piscataway, 1999.

[19] P. Craven and G. Wahba. Smoothing noisy data with spline functions: Estimating the correct degree of smoothing by the method of generalized cross-validation. *Numerische Mathematik*, 31.

[20] P. Yoon, S. Park, M. Sunwoo, I. Ohm and K. J. Yoon, *Closed Loop Control of Spark Advance and Air-Fuel Ratio in SI Engines Using Cylinder Pressure*, SAE 2000-01-0933

[21] S. Coffa and L. Occhipinti, *Monolithically integrated pressure sensor and related process for manufacturing*, U.S. Pat. No. 6,743,654 and EP1215476,

[22] N. R. Pal, K. Pal and J. C. Bezdek, *A Mixed c-Means Clustering Model*, Proceedings of IEEE International Conference on Fuzzy Systems, pp. 11-21, 1997.

[23] R. Maitra, *Clustering Massive Datasets with Applications in Software Metrics and Tomography*, J. Amer. Stat. Assoc., 1998.

[24] H. Frigui and R. Krishnapuram, *A Possibilistic approach to Clustering*, IEEE Transactions on Fuzzy Systems, vol. 1, No. 2, pp. 98-110, 1993.

[25] J. M. Leski, *An-Insensitive Fuzzy C-Means Clustering*, Int. J. Appl. Math. Comp. Sci., vol. 11, No. 4, pp. 993-1007, 2001.

[26] H. Frigui and R. Krishnapuram, *A Robust Competitive Clustering Algorithm With Applications in Computer Vision*, IEEE Transactions on Pattern Analysis and Machine Intelligence, vol. 21, No. 5, pp. 450-465, 1999.

That which is claimed is:

1. A method for sensing an air/fuel ratio in a combustion chamber of an internal combustion engine, the method comprising:
   sensing a pressure in at least one cylinder of the internal combustion engine;
   generating a pressure signal representative of the sensed pressure;
   extracting characteristic parameters of the pressure signal in a pressure cycle of the internal combustion engine;
   normalizing the characteristic parameters in a set range;
   choosing a subset of the characteristic parameters by a clustering algorithm;
   calculating moving averages of the chosen subset of parameters on a number of pressure cycles of the internal combustion engine; and
   generating a signal representative of the air/fuel ratio of the internal combustion engine as a function of the chosen subset of parameters.

2. The method of claim 1 wherein the chosen subset of parameters is chosen during a preliminary test phase, the preliminary test phase comprising:
   measuring a value of each characteristic parameter in each pressure cycle;
   sensing the air/fuel ratio at each pressure cycle;
   calculating a correlation coefficient between a sequence of air/fuel ratios and a sequence of values of each characteristic parameter; and
   choosing a number of characteristic parameters that are correlated with the air/fuel ratio.

3. The method of claim 1 wherein the number of pressure cycles on which the chosen subset of parameters are averaged is determined by at least:
   establishing a set of possible values of the chosen subset of parameters for the number of pressure cycles;
   for each possible value of the chosen subset of parameters for each pressure cycle, generating a respective dataset comprising sequences of moving averages of the chosen subset of parameters calculated on the number of pressure cycles;
   grouping each dataset in clusters by executing a clustering algorithm thereon;
   calculating a performance index for each execution of the clustering algorithm;
   estimating an ideal performance index of the clustering algorithm for each dataset corresponding to a variance of moving averages belonging to a same cluster being at a lower threshold value, and to a variance of moving averages belonging to different clusters being an upper threshold value;

calculating a clustering factor as a ratio between the performance index and the ideal performance index; and choosing a desired value of the number of pressure cycles as a value corresponding to the execution of the clustering algorithm for which the clustering factor is at an upper threshold value.

4. A device for sensing an air/fuel ratio in a combustion chamber of an internal combustion engine, the device comprising:

a pressure sensor to generate a pressure signal of a pressure in at least one cylinder of the internal combustion engine; and an offline trained learning machine to be input with the pressure signal, to extract from the pressure signal characteristic parameters thereof, and to generate as a function of the characteristic parameters a signal representative of the air/fuel ratio, said offline trained learning machine is based upon a neural network;

said offline trained learning machine comprising an identification subsystem to choose parameters of the pressure signal by a clustering algorithm, said offline trained learning machine to generate the signal representative of the air/fuel ratio as a function of the chosen parameters; and a pre-processor coupled in cascade to said identification subsystem and to generate a signal representing a moving average of the characteristic parameters of the pressure signal;

a neural network coupled in cascade to said pre-processor and to generate an intermediate signal indicative of the air/fuel ratio; and a post-processor to be input with the intermediate signal and to generate a signal representative of estimated air/fuel ratio of the internal combustion engine as a moving average of the intermediate signal.

5. The device of claim 4 wherein said offline trained learning machine is based upon a fuzzy system.

6. The device of claim 5 wherein said offline trained learning machine comprises:

a first fuzzy subsystem trained to generate a first intermediate signal indicative of the air/fuel ratio when the air/fuel ratio is less than 1;

a second fuzzy subsystem trained to generate a second intermediate signal indicative of the air/fuel ratio when the air/fuel ratio is greater than 1;

a third fuzzy subsystem trained to generate a third intermediate signal indicative of the air/fuel ratio when the air/fuel ratio is about 1;

three post-processors coupled in cascade to a respective fuzzy subsystem and to generate a first signal, a second signal, and a third signal, respectively, of an estimated air/fuel ratio of the internal combustion engine as a moving average of the respective intermediate signal inputted therein; and a multiplexer to be input with the first signal, the second signal, and the third signal of the estimated air/fuel ratio, and to output the first signal of the estimated air/fuel ratio or the second signal of the estimated air/fuel ratio as a function of the third intermediate signal.

7. The device of claim 6 wherein the third intermediate signal comprises a power signal.

8. The device of claim 6 wherein each of said fuzzy subsystems includes three inputs corresponding to a pressure value for a crank angle of 40 degrees, a pressure value for a crank angle of 50 degrees, and an upper threshold pressure value.

9. A device for sensing an air/fuel ratio in a combustion chamber of an internal combustion engine, the device comprising:

a pressure sensor to generate a pressure signal of a pressure in at least one cylinder of the internal combustion engine; and offline trained learning machine being based upon a fuzzy system and a neural network and comprising an identification subsystem choosing parameters of the pressure signal by a clustering algorithm;

said offline trained learning machine to be input with the pressure signal, to extract from the pressure signal characteristic parameters thereof, and to generate the signal representative of the air/fuel ratio as a function of the chosen parameters.

10. The device of claim 9 wherein said offline trained learning machine further comprises:

a pre-processor coupled in cascade to said identification subsystem and to generate a signal representing a moving average of the characteristic parameters of the pressure signal, the neural network coupled in cascade to said pre-processor and to generate an intermediate signal indicative of the air/fuel ratio; and a post-processor to be input with the intermediate signal and to generate a signal representative of estimated air/fuel ratio of the internal combustion engine as a moving average of the intermediate signal.

11. The device of claim 9 wherein said offline trained learning machine comprises:

a first fuzzy subsystem trained to generate a first intermediate signal indicative of the air/fuel ratio when the ratio air/fuel is less than 1;

a second fuzzy subsystem trained to generate a second intermediate signal indicative of the air/fuel ratio when the air/fuel ratio is greater than 1;

a third fuzzy subsystem trained to generate a third intermediate signal indicative of the air/fuel ratio when the air/fuel ratio is about 1;

three post-processors coupled in cascade to a respective fuzzy subsystem and to generate a first signal, a second signal, and a third signal, respectively, of an estimated air/fuel ratio of the internal combustion engine as a moving average of the respective intermediate signal inputted therein; and a multiplexer to be input with the first signal, the second signal, and the third signal of the estimated air/fuel ratio, and to output the first signal of the estimated air/fuel ratio or the second signal of the estimated air/fuel ratio as a function of the third intermediate signal.

* * * * *

UNITED STATES PATENT AND TRADEMARK OFFICE
CERTIFICATE OF CORRECTION

| | |
|---|---|
| PATENT NO. | : 7,962,272 B2 |
| APPLICATION NO. | : 12/202646 |
| DATED | : June 14, 2011 |
| INVENTOR(S) | : Cesario et al. |

It is certified that error appears in the above-identified patent and that said Letters Patent is hereby corrected as shown below:

| | |
|---|---|
| Column 2, Line 46 | Delete: "Engines" <br> Insert: --Engine-- |
| Column 3, Line 10 | Delete: "other" <br> Insert: --others-- |
| Column 3, Line 11 | Delete: "[6][7]" <br> Insert: --[6] and [7]-- |
| Column 4, Line 33 | Delete: "as difference" <br> Insert: --as the difference-- |
| Column 5, Line 57 | Delete: "on different" <br> Insert: --on a different-- |
| Column 5, Line 62 | Insert paragraph 41 after line 62: <br><br> --Another aspect is directed to a device for sensing the air/fuel ratio in a combustion chamber of an internal combustion engine. The device may include a pressure sensor generating a pressure signal of the pressure in at least a cylinder of the engine, and an offline trained learning machine input with the pressure signal, extracting from characteristic parameters thereof and generating as a function of the characteristic parameters a signal representative of the air/fuel ratio of the engine.-- |
| Column 10, Line 8 | Delete: "fit an user" <br> Insert: --fit a user-- |

Signed and Sealed this
Tenth Day of July, 2012

David J. Kappos
*Director of the United States Patent and Trademark Office*

CERTIFICATE OF CORRECTION (continued)

| | |
|---|---|
| Column 10, Line 28 | Delete: "means?" <br> Insert: --mean?-- |
| Column 10, Line 48 | Delete: "(2) e (3)" <br> Insert: --(2) and (3)-- |
| Column 12, Line 1 | Delete: "user can choice" <br> Insert: --the user can choose-- |
| Column 12, Line 5 | Delete: "number" <br> Insert: --numbers-- |
| Column 12, Line 7 | Delete: "theme" <br> Insert: --them-- |
| Column 13, Line 14 | Delete: "an user" <br> Insert: --a user-- |
| Column 14, Line 14 | Delete: "$P_{a\sin t.}^{FCM}(c) = -\sum_{k=1}^{N}\|\bar{x}-v_i\|^2 \quad (16)$" <br> Insert: --$P_{a\sin t.}^{FCM}(c) = -\sum_{k=1}^{N}\|\bar{x}-v_i\|^2 \quad (16)$-- |
| Column 14, Line 17 | Delete: "$P_{a\sin t.}^{FPCM}(c) = -\left(\frac{N}{c}+\left(\frac{c}{N}\right)^{n-1}\right)\cdot\sum_{k=1}^{N}\|\bar{x}-v_i\|^2 \quad (16)$" <br> Insert: --$P_{a\sin t.}^{FPCM}(c) = -\left(\frac{N}{c}+\left(\frac{c}{N}\right)^{n-1}\right)\cdot\sum_{k=1}^{N}\|\bar{x}-v_i\|^2 \quad (16)$-- |
| Column 15, Line 11 | Delete: "by data" <br> Insert: --by a data-- |
| Column 16, Line 4 | Delete: "$F(x^{(i)}) = d_b, i = 1, 2, ..., N \quad (17)$" <br> Insert: --$F(x^{(i)}) = d_i, i = 1, 2, ..., N \quad (17)$-- |
| Column 17, Line 1 | Delete: "by clustering" |

CERTIFICATE OF CORRECTION (continued)
U.S. Pat. No. 7,962,272 B2

|  |  |
|---|---|
|  | Insert: --by the clustering-- |
| Column 17, Line 58 | Delete: "neurons"<br>Insert: --neuron-- |
| Column 21, Line 9 | Delete: "tree-dimensional"<br>Insert: --three-dimensional-- |
| Column 22, Line 61 | Delete: "generate"<br>Insert: --generates-- |
| Column 23, Line 16 | Delete: "reach"<br>Insert: --reached-- |
| Column 23, Line 65 | Delete: "of less"<br>Insert: --less-- |
| Column 24, Line 9 | Delete: "lop"<br>Insert: --loop-- |